US011231511B2

(12) United States Patent
Wu et al.

(10) Patent No.: US 11,231,511 B2
(45) Date of Patent: Jan. 25, 2022

(54) REFLECTION SEISMOLOGY INTERNAL MULTIPLE ESTIMATION

(71) Applicant: WesternGeco LLC, Houston, TX (US)

(72) Inventors: Zhiming Wu, Katy, TX (US); Ahmed Rushdy Elsaid Elzein Ali, Houston, TX (US); Frederico Xavier de Melo, Katy, TX (US); Clement Kostov, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 214 days.

(21) Appl. No.: 16/622,307

(22) PCT Filed: Jul. 5, 2018

(86) PCT No.: PCT/US2018/040835
§ 371 (c)(1),
(2) Date: Dec. 13, 2019

(87) PCT Pub. No.: WO2019/010253
PCT Pub. Date: Jan. 10, 2019

(65) Prior Publication Data
US 2021/0149066 A1    May 20, 2021

Related U.S. Application Data

(60) Provisional application No. 62/528,906, filed on Jul. 5, 2017.

(51) Int. Cl.
*G01V 1/00* (2006.01)
*G01V 1/36* (2006.01)

(52) U.S. Cl.
CPC .............. *G01V 1/006* (2013.01); *G01V 1/005* (2013.01); *G01V 1/364* (2013.01); *G01V 2210/57* (2013.01)

(58) Field of Classification Search
CPC ........ G01V 1/006; G01V 1/005; G01V 1/364; G01V 2210/57; G01V 2210/56; G01V 1/36
See application file for complete search history.

(56) References Cited

U.S. PATENT DOCUMENTS 7,453,765 B2    11/2008   Ikelle
7,505,360 B2    3/2009    Bisley et al.
(Continued)

FOREIGN PATENT DOCUMENTS

BR    112020000094 A2 *   7/2020    ............... G01V 1/36
EP    2755058 A2          7/2014
(Continued)

OTHER PUBLICATIONS

Thomsen, "Weak elastic anisotropy", Geophysics, vol. 52, No. 10, pp. 1954-1966, Oct. 1986 (3 pages).
(Continued)

*Primary Examiner* — Daniel Pihulic
(74) *Attorney, Agent, or Firm* — Michael Guthrie

(57) ABSTRACT

A method includes receiving seismic data of a seismic survey; defining a two-dimensional domain in dimensions x and y; identifying a target trace (S, R) of the seismic survey where S represents a source at $(x_s, y_s)$ and where R represents a receiver at $(X_R, y_R)$; defining with respect to the two-dimensional domain, a source trace $(S, X_1)$ as a primary trace, a receiver trace $(R, X_2)$ as a primary trace, and a generator trace $(X_1, X_2)$ as associated with an interbed multiple generator; convolving the primary traces and cross-correlating with the generator trace for a plurality of different $(X_1, X_2)$ pairs where each of the plurality of $(X_1, X_2)$ pairs defines a line segment where the line segments are substantially parallel to one another; and, based at least in part on the convolving the primary traces and crosscorre- (Continued)

lating with the generator trace, generating seismic data with attenuated multiple energy.

20 Claims, 21 Drawing Sheets

(56) References Cited

U.S. PATENT DOCUMENTS

| | | | |
|---|---|---|---|
| 9,581,711 B2 | 2/2017 | Terenghi et al. | |
| 2006/0155477 A1 | 7/2006 | Matson et al. | |
| 2008/0043573 A1 | 2/2008 | Bisley et al. | |
| 2011/0199858 A1 | 8/2011 | Otnes et al. | |
| 2012/0033527 A1 | 2/2012 | Bisley et al. | |
| 2014/0200815 A1* | 7/2014 | Hung | G01V 1/36 702/16 |
| 2017/0031045 A1* | 2/2017 | Poole | G01V 1/364 |
| 2021/0149066 A1* | 5/2021 | Wu | G01V 1/364 |

FOREIGN PATENT DOCUMENTS

| | | | | |
|---|---|---|---|---|
| EP | 3649491 A1 * | 5/2020 | | G01V 1/364 |
| WO | 2015159149 A2 | 10/2015 | | |
| WO | WO-2019010253 A1 * | 1/2019 | | G01V 1/364 |

OTHER PUBLICATIONS

Wu et al., Robust internal multiple prediction algorithm, expanded abstract, SEG annual meeting, San Antonio, Texas, 2011, pp. 3541-3545.
Berkhout, A.J. and Verschuur, D.J.—1997—Estimation of multiple scattering by iterative inversion, Part I: Theoretical considerations. Geophysics 62, 1586.
Jakubowicz, H.—1998a—Wave Equation Prediction and Removal of Interbed Multiples. Extended Abstracts, 60th Conference, EAGE, Session 01-28 (2 pages).
Jakubowicz, H.—1998b—Wave equation prediction and removal of interbed multiples. SEG Expanded Abstracts 17, 1527.
Kelamis, P.G. and Verschuur, D.J.—2000—Surface-related multiple elimination on land seismic data—Strategies via case studies—Geophysics, 65, No. 3, pp. 719-734.
Kelamis, P.G., Verschuur, D.J., Erickson, K.E., Clark, R.L. and Burnstad, R.M.13 2002—Data-driven internal multiple attenuation-Applications and issues on land data. (5 pages).
Koek, E.A. and Ongkiehong, L.—1997—Regularization of 3-D seismic data in two steps. SEG Expanded Abstracts 16, 1171.
Moore, I.—2001—Practical implementation of interbed multiple attenuation. Exploration Geophysics 32, 080-088.
Tenkroode, F.—2002—Prediction of internal multiples. Wave Motion, 35, 315-338.
Ronen, J.—1987—Wave-equation trace interpolation. Geophysics 52 No. 7; 973-984.
Xavier de Melo, et al., 2017, Improving Inversion Accuracy by Optimal Internal Multiple Attenuation—A Case Study from the UAE; Extended Abstracts, 79th Conference, EAGE, Session New Concepts in Multiple Attenuation, DOI: 10.3997/2214-4609. 201701239 (5 pages).
Xu, S., Zhang, Y., Pham, D. and Lambaré, G.—2005—Antileakage Fourier transform for seismic data regularization. Geophysics 70, No. 4, V87-V95.
International Search Report and Written Opinion issued in the related PCT Application PCT/US2018/040835, dated Oct. 2, 2018 (9 pages).
Xavier De Melo, F et al., "Interbed Multiple Attenuation in Kuwait—a Minagish Case Study Revisited", 76th EAGE Conference Exhibition 2014, pp. 16-19.
Extended European Search Report and Opinion of European Patent Application No. 18827664.6 dated Mar. 4, 2021, 9 pages.
International Preliminary Report on Patentability issued in the related PCT Application PCT/US2018/040835, dated Jan. 16, 2020 (8 pages).

* cited by examiner

REFLECTION SEISMOLOGY INTERNAL MULTIPLE ESTIMATION

RELATED APPLICATIONS

This application claims priority to and the benefit of a US provisional application having Ser. No. 62/528,906, filed 5 Jul. 2017, which is incorporated by reference herein.

BACKGROUND

Reflection seismology finds use in the oil and gas industry, for example, to estimate properties of subsurface formations (e.g., to characterize a subterranean environment with one or more formations). As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Propagation of seismic energy, as in reflection seismology, can depend on one or more characteristics of a subsurface medium or media. Reflection seismology data can be used to understand or characterize one or more subsurface formations.

SUMMARY

In accordance with some embodiments, a method can include receiving seismic data of a seismic survey of a subterranean environment; defining a two-dimensional domain in dimensions x and y; identifying a target trace (S, R) of the seismic survey where S represents a source at ($x_S$, $y_S$) and where R represents a receiver at ($x_R$, $y_R$); defining with respect to the two-dimensional domain, a source trace (S, $X_1$) as a primary trace, a receiver trace (R, $X_2$) as a primary trace, and a generator trace ($X_1$, $X_2$) as associated with an interbed multiple generator defined with respect to a depth dimension z; convolving the primary traces and crosscorrelating with the generator trace for a plurality of different ($X_1$, $X_2$) pairs where each of the plurality of ($X_1$, $X_2$) pairs defines a line segment where the line segments are substantially parallel to one another; and, based at least in part on the convolving the primary traces and crosscorrelating with the generator trace, generating seismic data with attenuated multiple energy. In accordance with some embodiments, a system can include a processor; memory accessible by the processor; and processor-executable instructions stored in the memory that are executable to instruct the system to: receive seismic data of a seismic survey of a subterranean environment where the seismic data are acquired via survey equipment that includes seismic energy sources and seismic energy receivers arranged according to a seismic survey geometry; define a two-dimensional domain in dimensions x and y; identify a target trace (S, R) of the seismic survey where S represents a source at ($x_S$, $y_S$) and where R represents a receiver at ($x_R$, $y_R$); define with respect to the two-dimensional domain, a source trace (S, $X_1$) as a primary trace, a receiver trace (R, $X_2$) as a primary trace, and a generator trace ($X_1$, $X_2$) as associated with an interbed multiple generator defined with respect to a depth dimension z; convolve the primary traces and crosscorrelate with the generator trace for a plurality of different ($X_1$, $X_2$) pairs where each of the plurality of ($X_1$, $X_2$) pairs defines a line segment where the line segments are substantially parallel to one another; and, based at least in part on the convolution of the primary traces and crosscorrelation with the generator trace, generate seismic data with attenuated multiple energy. In accordance with some embodiments, one or more computer-readable storage media can include computer-executable instructions to instruct a system to: receive seismic data of a seismic survey of a subterranean environment where the seismic data are acquired via survey equipment that includes seismic energy sources and seismic energy receivers arranged according to a seismic survey geometry; define a two-dimensional domain in dimensions x and y; identify a target trace (S, R) of the seismic survey where S represents a source at ($x_S$, $y_S$) and where R represents a receiver at ($x_R$, $y_R$); define with respect to the two-dimensional domain, a source trace (S, $X_1$) as a primary trace, a receiver trace (R, $X_2$) as a primary trace, and a generator trace ($X_1$, $X_2$) as associated with an interbed multiple generator defined with respect to a depth dimension z; convolve the primary traces and crosscorrelate with the generator trace for a plurality of different ($X_1$, $X_2$) pairs where each of the plurality of ($X_1$, $X_2$) pairs defines a line segment where the line segments are substantially parallel to one another; and, based at least in part on the convolution of the primary traces and crosscorrelation with the generator trace, generate seismic data with attenuated multiple energy.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in the oil and gas industry, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Figure 1:
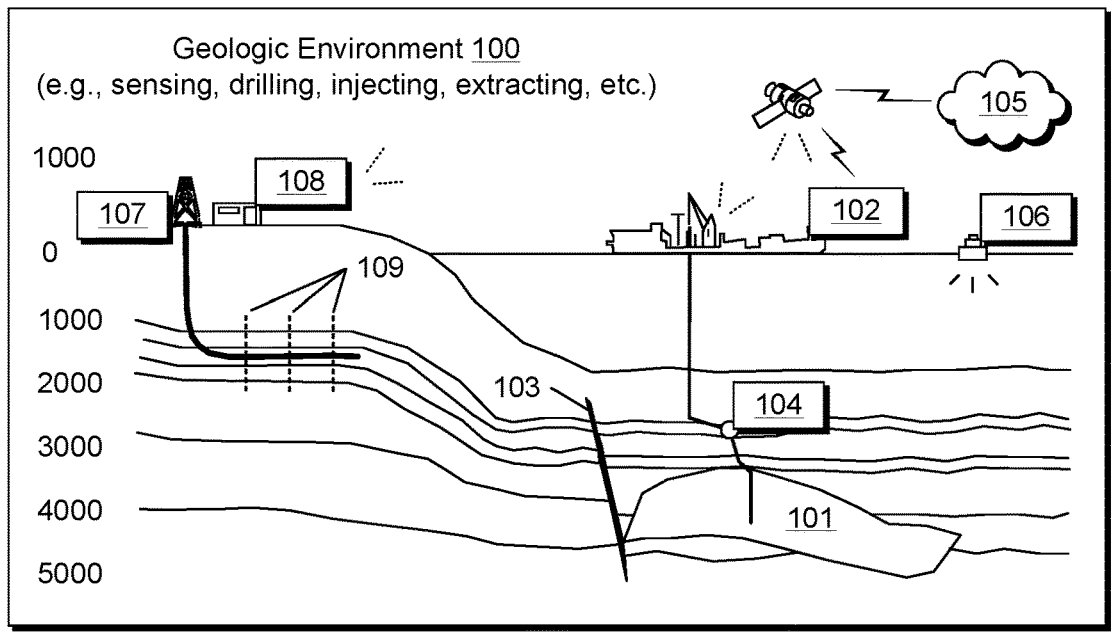
FIG. 1 illustrates an example of a geologic environment, an example of a technique and examples of free-surface multiples.
Figure 1:
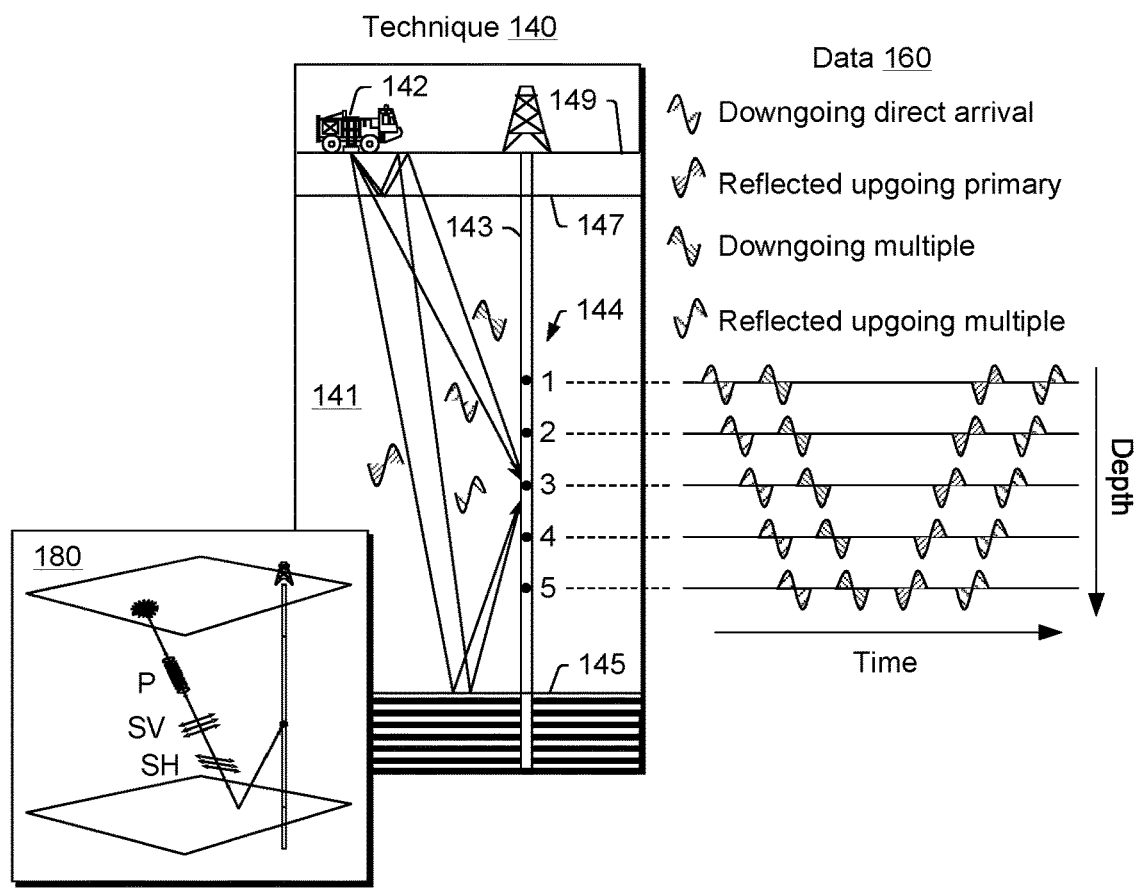

FIG. 1 shows an example of a geologic environment 100 (e.g., an environment that includes a sedimentary basin, a reservoir 101, a fault 103, one or more fractures 109, etc.) and an example of an acquisition technique 140 to acquire seismic data (see, e.g., data 160). As an example, a system may process data acquired by the technique 140, for example, to allow for direct or indirect management of sensing, drilling, injecting, extracting, etc., with respect to the geologic environment 100. In turn, further information about the geologic environment 100 may become available as feedback (e.g., optionally as input to the system). As an example, an operation may pertain to a reservoir that exists in the geologic environment 100 such as, for example, the reservoir 101. As an example, a technique may provide information (e.g., as an output) that may specifies one or more location coordinate of a feature in a geologic environment, one or more characteristics of a feature in a geologic environment, etc.

As an example, the geologic environment 100 may be referred to as or include one or more formations. As an example, a formation may be a unit of lithostratigraphy, for example, a body of rock that is sufficiently distinctive and continuous that it can be mapped. As an example, in stratigraphy, a formation may be a body of strata of predominantly one type or combination of types, for example, where multiple formations form groups, and subdivisions of formations are members.

As an example, a sedimentary basin may be a depression in the crust of the Earth, for example, formed by plate tectonic activity in which sediments accumulate. Over a period of geologic time, continued deposition may cause further depression or subsidence. With respect to a petroleum systems analysis, if rich hydrocarbon source rocks occur in combination with appropriate depth and duration of burial, hydrocarbon generation may possibly occur within a basin. Exploration plays and prospects may be developed in basins or regions in which a complete petroleum system has some likelihood of existing. The geologic environment 100 of FIG. 1 may include one or more plays, prospects, etc.

As an example, a system may be implemented to process seismic data, optionally in combination with other data. Processing of data may include generating one or more seismic attributes, rendering information to a display or displays, etc. A process or workflow may include interpretation, which may be performed by an operator that examines renderings of information and that identifies structure or other features within such renderings. Interpretation may be or include analyses of data with a goal to generate one or more models and/or predictions (e.g., about properties and/or structures of a subsurface region).

As an example, a system may include features of a commercially available framework such as the PETREL® seismic-to-simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment, decision making, operational control, etc.).

As an example, a system may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components (e.g., modules, blocks, etc.) may be implemented as add-ons (or plug-ins) that conform to and operate according to specifications of a framework environment (e.g., according to application programming interface (API) specifications, etc.).

As an example, seismic data may be processed using a framework such as the OMEGA® framework (Schlumberger Limited, Houston, Tex.). The OMEGA® framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA® framework.

A framework for processing data may include features for 2D line and 3D seismic surveys. Modules for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and poststack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

In the example of FIG. 1, the geologic environment 100 includes an offshore portion and an on-shore portion. As an example, a geologic environment may be or include one or more of an offshore geologic environment, a seabed geologic environment, an ocean bed geologic environment, etc.

As an example, the geologic environment 100 may be outfitted with any of a variety of sensors, detectors, actuators, etc. For example, equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 105 that may be configured for communications, noting that the satellite may additionally or alternatively include circuitry for imagery (e.g., spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 107 and/or 108 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.). As an example, a workflow may include rendering information to a display (e.g., a display device). As an example, a workflow may include receiving instructions to interact with rendered information, for example, to process information and optionally render processed information. As an example, a workflow may include transmitting information that may control, adjust, initiate, etc. one or more operations of equipment associated with a geologic environment (e.g., in the environment, above the environment, etc.).

In FIG. 1, the technique 140 may be implemented with respect to a geologic environment 141. As shown, an energy source (e.g., a transmitter) 142 may emit energy where the energy travels as waves that interact with the geologic environment 141. As an example, the geologic environment 141 may include a bore 143 where one or more sensors (e.g., receivers) 144 may be positioned in the bore 143. As an example, energy emitted by the energy source 142 may interact with a layer (e.g., a structure, an interface, etc.) 145 in the geologic environment 141 such that a portion of the energy is reflected, which may then be sensed by one or more of the sensors 144. Such energy may be reflected as an upgoing primary wave (e.g., or "primary" reflected wave). As an example, a portion of emitted energy may be reflected by more than one structure in the geologic environment and referred to as a multiple reflected wave (e.g., or "multiple"). For example, the geologic environment 141 is shown as including a layer 147 that resides below a surface layer 149. Given such an environment and arrangement of the source 142 and the one or more sensors 144, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water-bottom interface (e.g., an interface of a base of water and rock or sediment beneath it) or evidence of a multiple from an air-water interface, etc.

As shown in FIG. 1, the acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\varepsilon$, $\delta$ and $\gamma$. As an example, the Thomsen parameters $\varepsilon$ and $\gamma$ may be estimated from wave data while estimation of the Thomsen parameter $\delta$ may involve access to additional information. As to prior information, one or more sources may provide values for parameters such as one or more of the Thomsen parameters. For example, a source may be a database that includes values for various types of media. A source may be an article such as, for example, Thomsen, "Weak elastic anisotropy", Geophysics, Vol. 51, No. 10, pp. 1954-1966, October 1986, which provides a table of measured anisotropy in sedimentary rocks where such rocks include sandstones, shales, mudshales, silty limestones, clayshales, laminated siltstones, tuff, crystals (e.g., hexagonal, etc.), gypsum weathered materials, etc.

As an example, seismic data may be acquired for a region in the form of traces. Such a process can be referred to as a seismic survey. A seismic survey can generate one or more sets of seismic data, where such data are from seismic measurements that can be recorded with reference to a particular area of the Earth's surface, to evaluate the subsurface. A seismic survey can be multi-dimensional (spatially and/or temporally) and performed using land equipment, marine equipment or a combination of land and marine equipment. In a 3D spatial seismic survey, an acquisition geometry can include spaced receiver and shot lines. A land survey can utilize receivers (e.g., sensors) spaced prior to shot emissions (e.g., source emissions). In a marine survey, streamers that include receivers may be towed to a position at which one or more shots are fired (e.g., source emissions). A marine survey can include an ocean bottom survey, which may utilize ocean bottom cables or ocean bottom receiver units (e.g., individual units). Some types of seismic surveys involve use of one or more downhole pieces of equipment (e.g., in a borehole, etc.).

In the example of FIG. 1, the technique 140 may include the source 142 for emitting energy where portions of such energy (e.g., directly and/or reflected) may be received via the one or more sensors 144. The technique 140 is illustrated with respect to a borehole, noting that the various types of energy can occur in a land survey, a marine survey, etc., where a borehole may or may not be utilized.

As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 2:
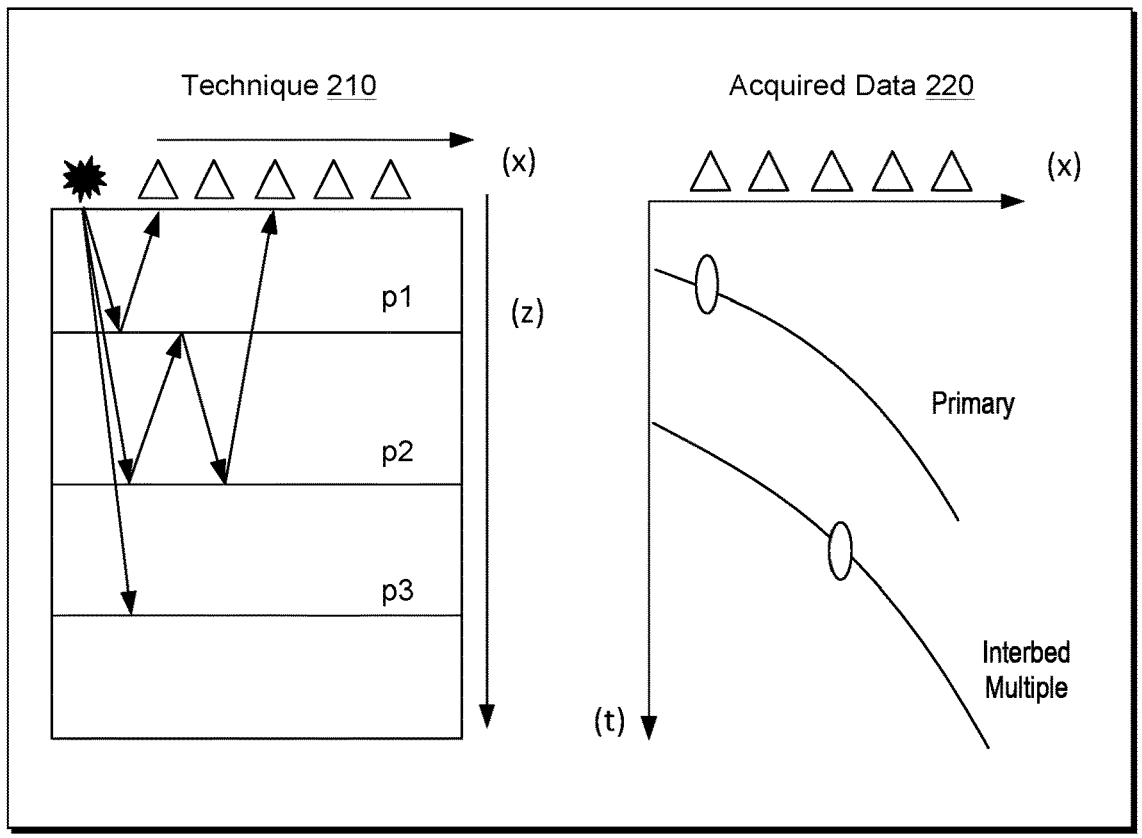
FIG. 2 illustrates examples of techniques, signals and acquired data.
Figure 2:
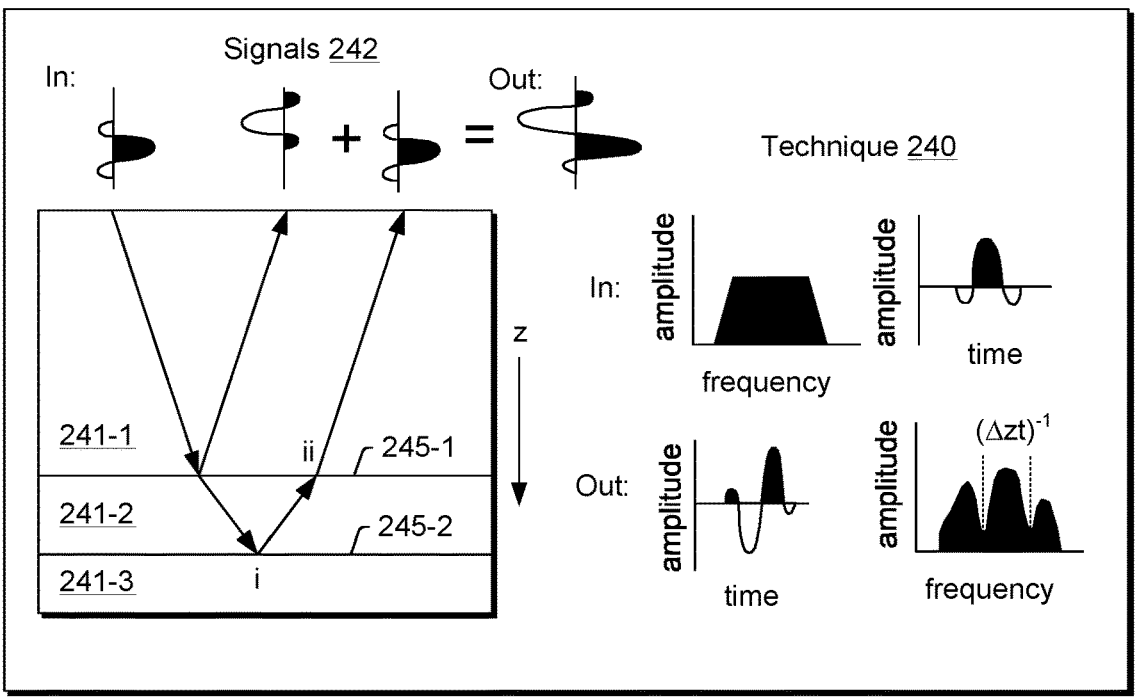

FIG. 2 shows an example of a technique 210 and acquired data 220, an example of a technique 240 and signals 242. As mentioned, a survey can include utilizing a source or sources and receivers. In the example technique 210, a source is illustrated along with a plurality of receivers that are spaced along a direction defined as an inline direction x. A subsurface region being surveyed includes features such as horizons p1, p2 and p3 that can be interfaces where elastic properties can differ such that seismic energy is at least in part reflected. For example, a horizon can be an interface that might be represented by a seismic reflection, such as the contact between two bodies of rock having different seismic velocity, density, porosity, fluid content, etc. In the example of FIG. 2, the technique 210 is shown to generate seismic reflections, which can include singly reflected and multiply reflected seismic energy. The acquired data 220 illustrate energy received by receivers with respect to time and their inline position. As shown, singly reflected energy can be defined as primary (or primaries) while multiply reflected energy can be defined as multiples such as interbed multiples (e.g., IM).

A primary can be defined as a seismic event whose energy has been reflected once; whereas, a multiple can be defined as an event whose energy has been reflected more than once. With respect to seismic interpretation, whether manual, semi-automatic or automatic, various techniques may aim to enhance primary reflections to facilitate interpretation of one or more subsurface interfaces. In other words, multiples can be viewed as extraneous signal or noise that can interfere with an interpretation process.

Some examples of process that aim to attenuate the presence of multiples (e.g., the presence of information in seismic data that corresponds to multiple energy) include adaptive subtraction processes.

As an example, an adaptive subtraction process can include modeling of multiples to generate a model (e.g., a multiples model) followed by subtracting the model from the acquired data. Acquisition geometry, sampling imperfections, algorithm assumptions, low signal-to-noise levels, or complex geology can cause prediction methods to produce models of multiple energy that do not precisely match the multiple events in the data. Consequently, these models cannot be subtracted from the seismic dataset without adjusting for timing, amplitude, and phase errors.

As an example, an approach can include least-squares simultaneous subtraction. Such a process performs adaptive matching and subtraction of one or more noise models by using least-squares-derived temporal filters to simultaneously match the models to the input seismic data. Matching filters are calculated in different time and space windows within a given input gather.

Another example includes adaptive subtraction with a curvelet transform, which is an iterative workflow that makes use of the ability to separate primary energy from the multiple model to derive an effective matching operator. Combining traditional least-squares adaptive subtraction with the complex-value-based curvelet domain representation of the seismic data can make for an overall approach for attenuating complex surface multiples.

Yet another technique is referred to as extended internal multiple prediction (XIMP™), which is a data-driven multiple-modeling approach for prediction of internal multiples from recorded events using wavefield extrapolation, for example, based on the Kirchhoff integral.

As explained, internal or interbed multiples can be created by seismic reflections bouncing between closely spaced geological beds, resulting in multiples that have little moveout or velocity difference compared with the primaries that generated them. These multiples can contaminate land datasets and other types of datasets. As such multiples can be difficult to differentiate from the primaries, especially in areas with relatively flat geology, they can be more difficult to address than surface-related multiples.

An XIMP™ approach can include predict internal multiples at true azimuth. An azimuth can be the angle that characterizes a direction or vector relative to a reference direction (e.g., "true" north) on a horizontal plane. An azimuth may be defined as an angle between 0 and 360 degrees, noting that symmetry may exist or other degeneracies depending on context. For example, with respect to a source and a receiver, an azimuth may be defined as an angle in a range from 0 to 179 degrees (e.g., as 0 degrees and 180 degrees are the same and as 180 to 359 degrees are the same as 0 to 179 degrees).

XIMP™ can be implemented without a prior velocity function to differentiate between primaries and internal multiples. XIMP™ can take onset times of multiple-generating events as input, which can be determined, for example, using interpretation and VSP and well data.

In media with moderate structural complexity, XIMP™ can be utilized to handle acquisition geometry and predict multiples at true azimuth, which can be helpful for full-azimuth land acquisitions, etc. XIMP™ provides a true-azimuth internal multiple model and an accurate estimate of the multiple energy in the data. The multiple energy can be removed from the data by using one or more adaptive subtraction techniques. Using XIMP™ in conjunction with 3D surface demultiple techniques (e.g., 3D GSMP general surface multiple prediction) can result in a better representation of the primary energy, which can facilitate interpretation of reflectors, etc.

As an example, an interpretation process can include handling reflectors (e.g., horizons, etc.) sequentially. For example, multiple modeling can occur for an identified reflector (e.g., p1) followed by attenuation the modeled multiples to generate multiple attenuated seismic data, which can be interpreted for a deeper reflector (e.g., p2). Once the deeper reflector is identified, multiple modeling may be applied again where an iterative process can proceed to deeper and deeper reflectors (e.g., horizons, etc.).

As an example, the technique 240 may include emitting energy with respect to time where the energy may be represented in a frequency domain, for example, as a band of frequencies. In such an example, the emitted energy may be a wavelet and, for example, referred to as a source wavelet which has a corresponding frequency spectrum (e.g., per a Fourier transform of the wavelet).

As an example, a geologic environment may include layers 241-1, 241-2 and 241-3 where an interface 245-1 exists between the layers 241-1 and 241-2 and where an interface 245-2 exists between the layers 241-2 and 241-3. As illustrated in FIG. 2, a wavelet may be first transmitted downward in the layer 241-1; be, in part, reflected upward by the interface 245-1 and transmitted upward in the layer 241-1; be, in part, transmitted through the interface 245-1 and transmitted downward in the layer 241-2; be, in part, reflected upward by the interface 245-2 (see, e.g., "i") and transmitted upward in the layer 241-2; and be, in part, transmitted through the interface 245-1 (see, e.g., "ii") and again transmitted in the layer 241-1. In such an example, signals (see, e.g., the signals 262) may be received as a result of wavelet reflection from the interface 245-1 and as a result of wavelet reflection from the interface 245-2. These signals may be shifted in time and in polarity such that addition of these signals results in a waveform that may be analyzed to derive some information as to one or more characteristics of the layer 241-2 (e.g., and/or one or more of the interfaces 245-1 and 245-2). For example, a Fourier transform of signals may provide information in a frequency domain that can be used to estimate a temporal thickness (e.g., $\Delta zt$) of the layer 241-2 (e.g., as related to acoustic impedance, reflectivity, etc.).

As explained, interbed multiple signals may be received by one or more receivers over a period of time in a manner that acts to "sum" their amplitudes with amplitudes of other signals. In such an example, the additional interbed signals may interfere with an analysis that aims to determine one or more characteristics of the layer 241-2 (e.g., and/or one or more of the interfaces 245-1 and 245-2). For example, interbed multiple signals may interfere with identification of a layer, an interface, interfaces, etc. (e.g., consider an analysis that determines temporal thickness of a layer, etc.).

Figure 3:
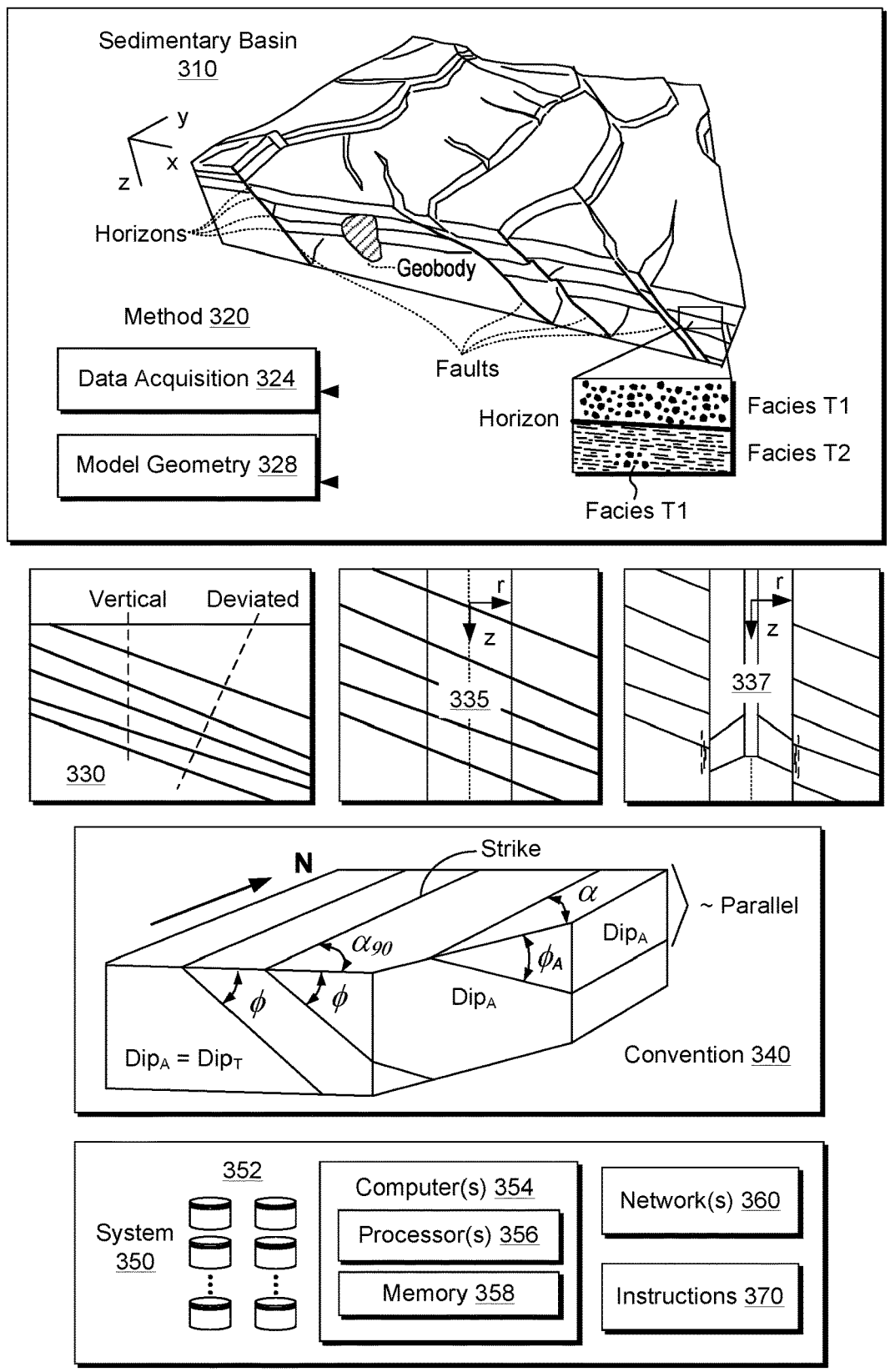
FIG. 3 illustrates examples of an environment, an example of a method and an example of a convention.

FIG. 3 shows an example of a sedimentary basin 310 (e.g., a geologic environment), an example of a method 320 for model building (e.g., for a simulator, etc.), an example of a formation 330, an example of a borehole 335 in a formation, an example of a convention 340 and an example of a system 350.

As an example, data acquisition, reservoir simulation, petroleum systems modeling, etc. may be applied to characterize various types of subsurface environments, including environments such as those of FIG. 1.

In FIG. 3, the sedimentary basin 310, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 320 includes a data acquisition block 324 and a model geometry block 328. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

The aforementioned commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows. As an example, the TECHLOG® framework may be implemented in a workflow, for example, using one or more features for petrophysics (core and log), geology, drilling, reservoir and production engineering, and geophysics.

As shown in FIG. 3, the formation 330 includes a horizontal surface and various subsurface layers. As an example, a borehole may be vertical. As another example, a borehole may be deviated. In the example of FIG. 3, the borehole 335 may be considered a vertical borehole, for example, where the z-axis extends downwardly normal to the horizontal surface of the formation 330. As an example, a tool 337 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, data can include geochemical data. For example, consider data acquired using X-ray fluorescence (XRF) technology, Fourier transform infrared spectroscopy (FTIR) technology and/or wireline geochemical technology.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the commercially available LITHO SCANNER™ technology marketed by Schlumberger Limited (Houston, Tex.). As an example, a LITHO SCANNER™ tool may be a gamma ray spectroscopy tool.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the aforementioned TECHLOG® framework (Schlumberger Limited, Houston, Tex.).

As to the convention 340 for dip, as shown, the three dimensional orientation of a plane can be defined by its dip and strike, which can be considered to be types of orientation information (e.g., structural orientation information). Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 340 of FIG. 3, various angles θ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 3 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 340 of FIG. 3). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 340 of FIG. 3). Apparent dip may be the dip of a plane as measured in any other direction except in the direction of true dip (see, e.g., $\phi_A$ as $Dip_A$ for angle α); however, it is possible that the apparent dip is equal to the true dip (see, e.g., φ as $Dip_A$=$Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 340 of FIG. 3, the dip of a plane as seen in a cross-section perpendicular to the strike is true dip (see, e.g., the surface with φ as $Dip_A$=$Dip_T$ for angle $\alpha_{90}$ with respect to the strike). As indicated, dip observed in a cross-section in any other direction is apparent dip (see, e.g., surfaces labeled $Dip_A$). Further, as shown in the convention 340 of FIG. 3, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation and borehole azimuth) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 340 may be used with respect to an analysis, an interpretation, an attribute, etc. (e.g., consider a PETREL® seismic-to-simulation framework workflow, etc.). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 3, the system 350 includes one or more information storage devices 352, one or more computers 354, one or more networks 360 and one or more sets of instructions 370. As to the one or more computers 354, each computer may include one or more processors (e.g., or processing cores) 356 and memory 358 for storing instructions, for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 352.

As an example, the one or more sets of instructions 370 may include instructions stored in memory and accessible to one or more of the one or more processors 356 in a manner that allows for execution thereof by such of one or more processors 356 to instruct the system 350 to perform various actions. As an example, the system 350 may be configured such that the one or more sets of instructions 370 provide for establishing the framework or a portion thereof. As an example, one or more methods, techniques, etc. may be performed using one or more sets of instructions, which may be, for example, one or more of the one or more sets of instructions 370 of FIG. 3.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

As mentioned, seismic data acquisition can include 3D and/or 4D land seismic data acquisition, such as during exploration for underground hydrocarbon-bearing reservoirs, or monitoring existing reservoirs. Electromagnetic signals may be used to transfer data to and/or from the sensor units, to transmit power, and/or to receive instructions to operate the sensor units.

Figure 4:
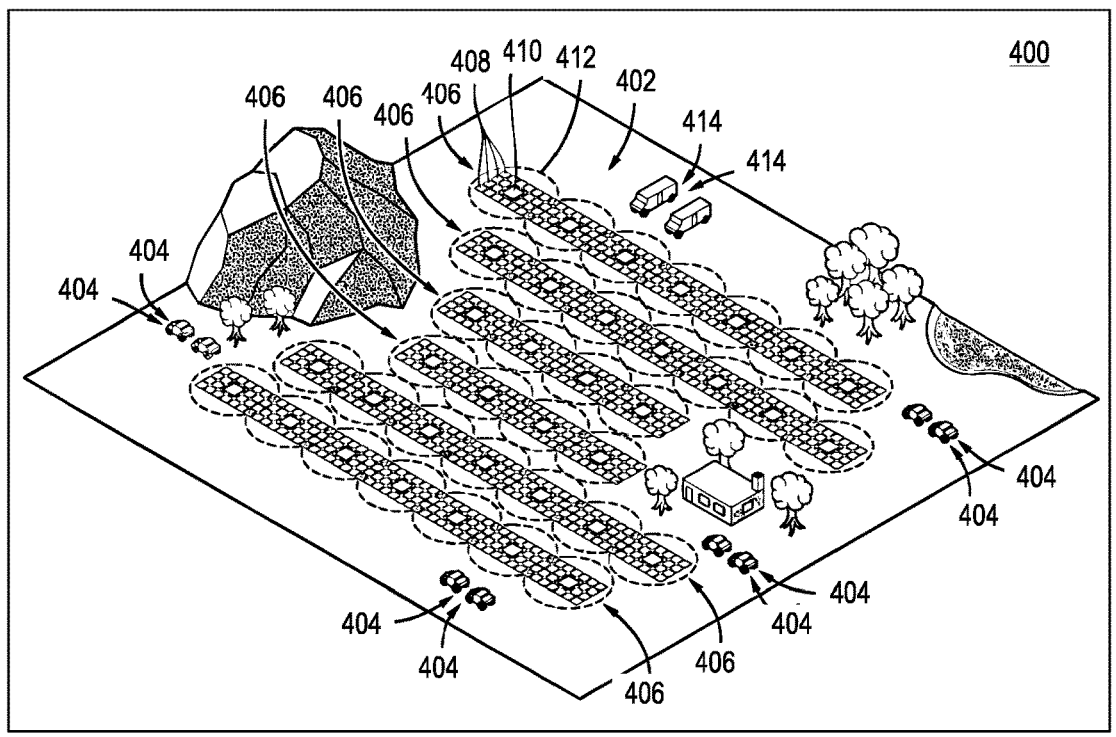
FIG. 4 illustrates examples of surveys.
Figure 4:
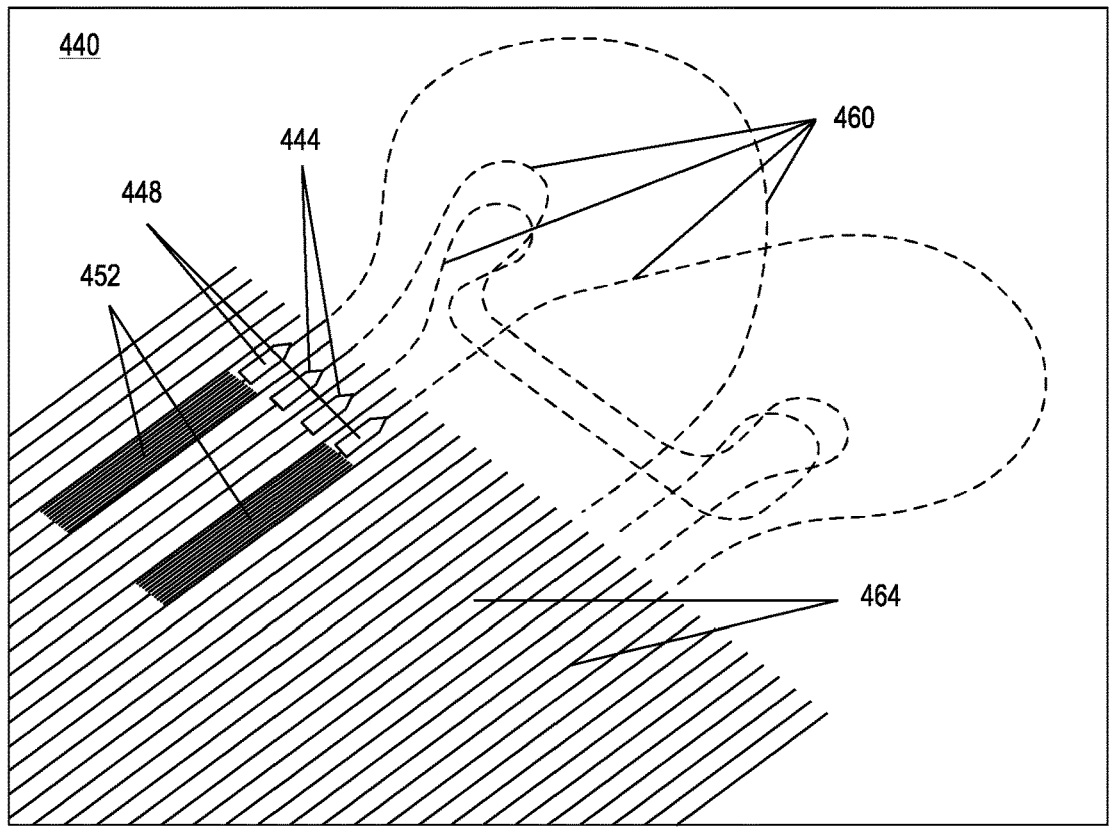

FIG. 4 shows an example of a simplified schematic view of a land seismic data acquisition system 400 and an example of a simplified schematic view of a marine seismic data acquisition system 440.

As shown with respect to the system 400, an area 402 to be surveyed may or may not have physical impediments to direct wireless communication between a recording station 414 (which may be a recording truck) and a vibrator 404. A plurality of vibrators 404 may be employed, as well as a plurality of sensor unit grids 406, each of which may have a plurality of sensor units 408.

As illustrated in FIG. 4, approximately 24 to about 28 sensor units 408 may be placed in a vicinity (a region) around a base station 410. The number of sensor units 408 associated with each base station 410 may vary from survey to survey. Circles 412 indicate an approximate range of reception for each base station 410.

In the system 400 of FIG. 4, the plurality of sensor units 408 may be employed in acquiring and/or monitoring land-seismic sensor data for the area 402 and transmitting the data to the one or more base stations 410. Communications between the vibrators 404, the base stations 410, the recording station 414, and the seismic sensors 408 may be wireless (at least in part via air for a land-based system; or optionally at least in part via water for a sea-based system).

In the system 440 of FIG. 4, source vessels 440 may be utilized with streamer vessels 448 or a vessel or vessels may tow both a source or sources and a streamer or streamers 452. In the example of FIG. 4, the vessels 444 and 448 (e.g., or just the vessels 448 if they include sources) may follow predefined routes for an acquisition geometry that includes inline and crossline dimensions. As shown, routes 460 can be for maneuvering the vessels to positions 464 as part of the survey.

The example systems 400 and 440 of FIG. 4 demonstrate how surveys may be performed according to an acquisition geometry that includes dimensions such as inline and crossline dimensions, which may be defines as x and y dimensions in a plane or surface where another dimension, z, is a depth dimension. As explained, time can be a proxy for depth, depending on various factors, which can include knowing how many reflections may have occurred as a single reflection may mean that depth of a reflector can be approximated using one-half of a two-way traveltime, some indication of the speed of sound in the medium and positions of the receiver and source (e.g., corresponding to the two-way traveltime).

Two-way travel time can be defined as the elapsed time for a seismic wave to travel from its source to a given reflector and return to a receiver (e.g., at a surface, etc.). As an example, a minimum two-way traveltime can be defined to be that of a normal-incidence wave with zero offset.

Figure 5:
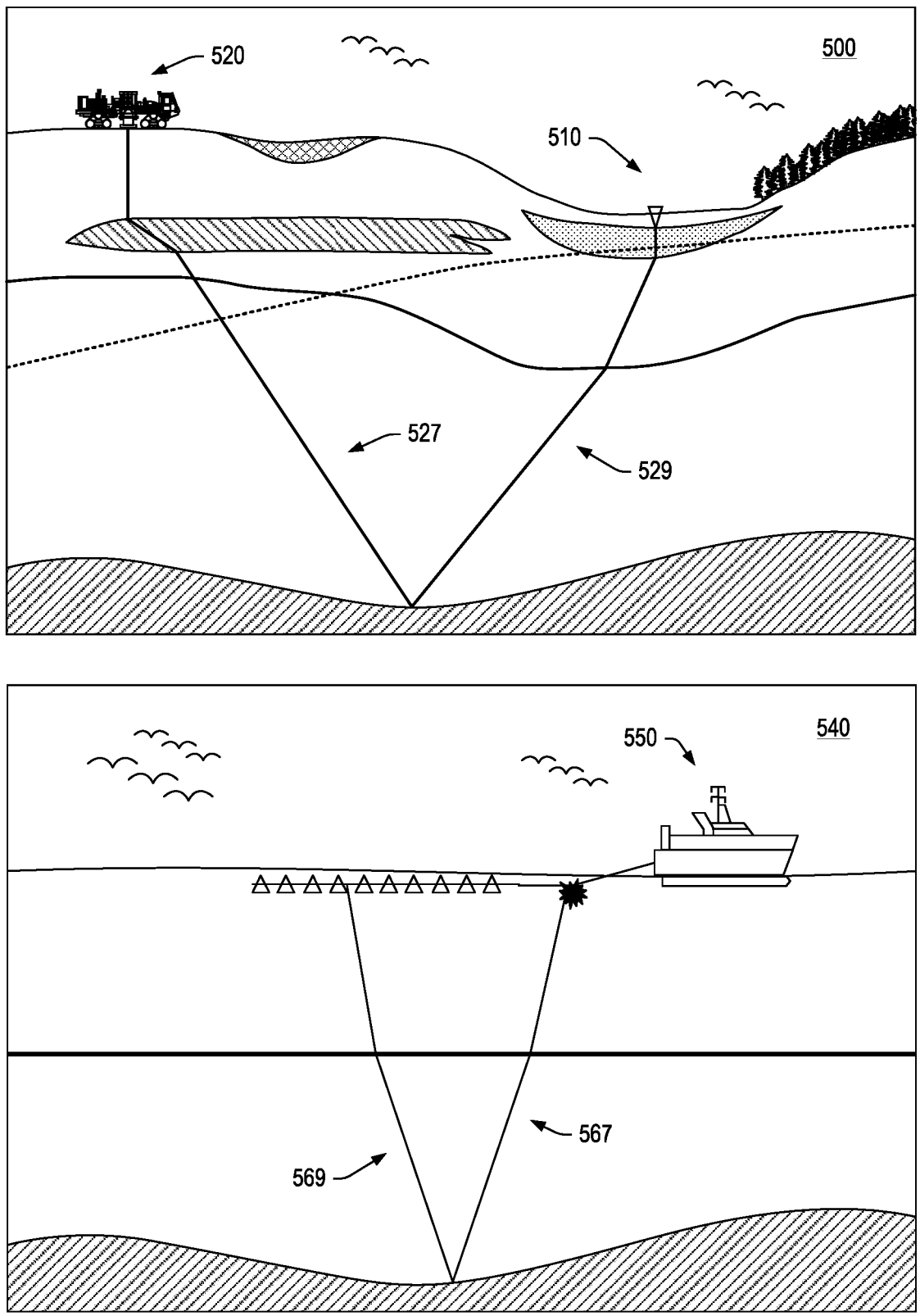
FIG. 5 illustrates examples of surveys.

FIG. 5 shows simplified examples of seismic energy in a land survey 500 and in a marine survey 540. The survey 500 includes equipment 510 and 520, downgoing energy 527, upgoing energy 529 where the equipment 510 can include one or more cables and a plurality of sensor units as nodes in an array or grid.

The equipment 510 and 520 can be part of a field installation where the equipment 510 that includes an array of sensor units for performing a seismic survey where the equipment 520 includes one or more seismic energy emission vehicles that can emit seismic energy to be sensed by the array of sensors where data can be collected by a receiver vehicle that may be as operatively coupled to the array of sensors.

In the survey 500, the equipment 520 can emit energy at a location and the equipment 510 can receive energy at a location. The emitted energy can be at least in part along a path of the downgoing energy 527 and the received energy can be at least in part along a path of the upgoing energy 529.

In FIG. 5, the survey 500 may be in a geologic environment such as a desert such that a cable that includes individual sensor units can be for deployment by an individual as that individual walks or drives along paths, which may be inline or crossline paths associated with a seismic survey. The individual sensor units can include spikes that can be inserted into sand of a desert environment or tripod or other style base(s).

A sensor unit may be a UNIQ™ sensor unit (Schlumberger Limited, Houston, Tex.) or another type of sensor unit. A sensor unit may include an accelerometer or accelerometers. A sensor may be a geophone. A sensor may include circuitry for 1C acceleration measurement, 2C acceleration measurement and/or 3C acceleration measurement. A sensor unit can include memory to perform data buffering and optionally retransmission. A sensor unit may include short circuit isolation circuitry, open circuit protection circuitry and earth-leakage detection and/or isolation circuitry.

A sensor unit may include one or more of location circuitry (GPS, etc.), temperature measurement circuitry, humidity measurement circuitry, circuitry for automated re-routing of data and/or power (as to supply, connection, etc.) and one or more other types of circuitry.

In FIG. 5, the survey 540 includes equipment 550, which can be a vessel that tows one or more sources and one or more streamers. In the survey 540, a source of the equipment 550 can emit energy at a location and a receiver of the equipment 550 can receive energy at a location. The emitted energy can be at least in part along a path of the downgoing energy 567 and the received energy can be at least in part along a path of the upgoing energy 569.

In the examples of FIG. 5, the paths are illustrated as single reflection paths for sake of simplicity. In the environments illustrated, additional interactions, reflections can be expected. For example, ghosts may be present. A ghost can be defined as a short-path multiple, or a spurious reflection that occurs when seismic energy initially reverberates upward from a shallow subsurface and then is reflected downward, such as at the base of weathering or between sources and receivers and the sea surface. As an example, the equipment 550 can include a streamer that is configured to position receivers a distance below an air-water interface such that ghosts can be generated where upgoing energy impacts the air-water interface and then reflects downward to the receivers. In such an example, a process may be applied that aims to "deghost" seismic data.

As an example, where a seismic survey generates multiples, a workflow may aim to attenuate the presence of those multiples in seismic survey data. Such a workflow can include generation of multiple attenuated seismic data. Such data may be considered to have a lesser noise than acquired data, for example, where primaries are desirable for analysis to characterize a subterranean environment. As an example, consider primaries being signal and multiples being a type of noise that can obscure the signal. In such an example, a multiple attenuation workflow that receives seismic data and that de-noises the seismic data to generate "cleaner" seismic data (e.g., with a higher signal to noise ratio) can facilitate reservoir characterization (e.g., as to lithology, as to reflector locations, as to geobodies, etc.).

The multiple attenuation workflow can include acquiring and analyzing data to understand and identify various contributing formations responsible for generation of internal multiple reverberations arriving at a target zone; performing a data-driven forward modelling multiple prediction of surface and internal multiples; and performing adaptive subtraction that aims to adjust for modelling imperfections and attenuating multiple contamination from a field dataset.

Figure 6:
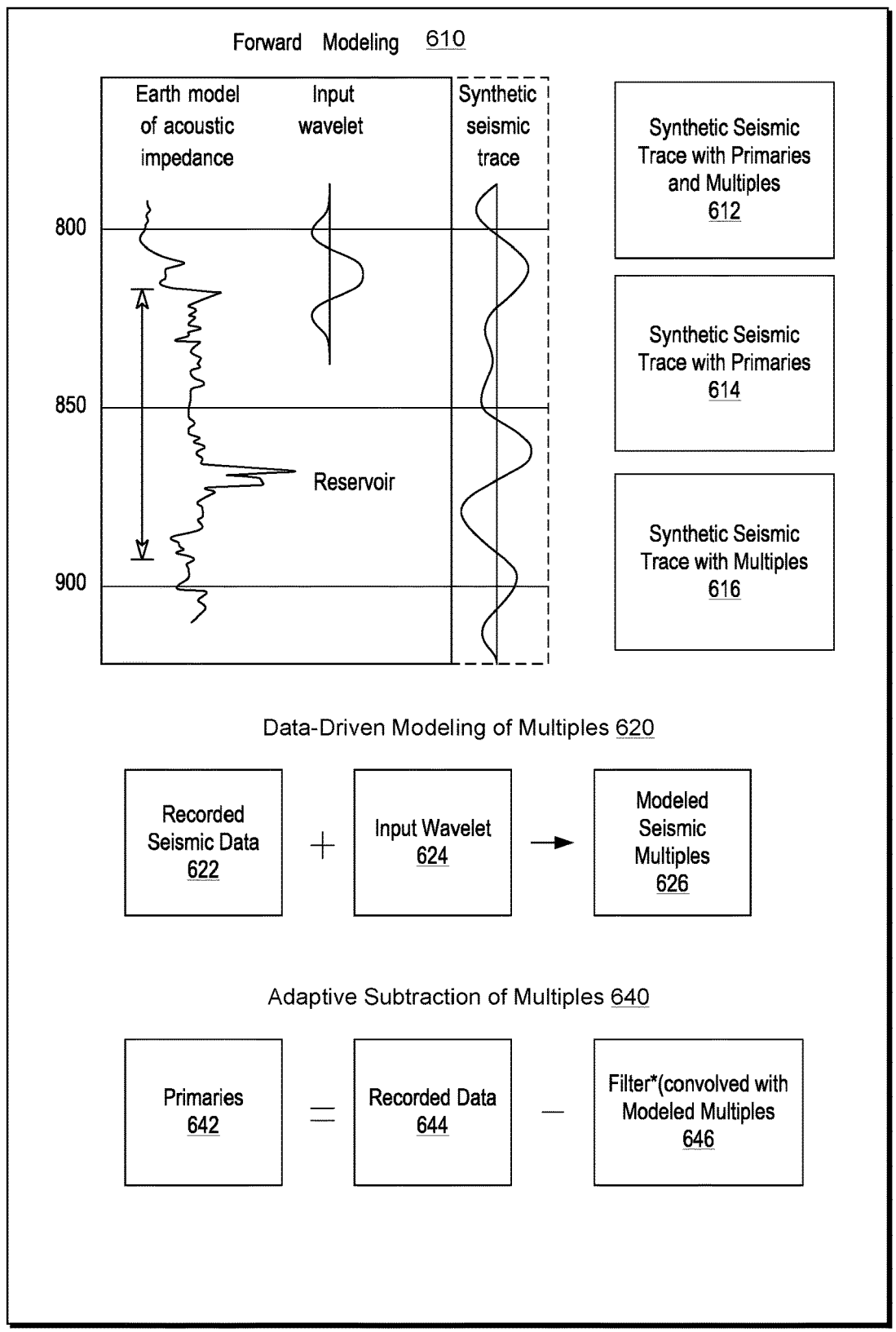
FIG. 6 illustrates examples of methods.

FIG. 6 shows an example of a forward modeling method 610, an example of a data-driven modeling of multiples method 620 and an example of an adaptive subtraction of multiples method 640.

As shown, the forward modeling method 610 progresses from an earth model of acoustic impedance and an input wavelet to a synthetic seismic trace. An inverse process, referred to as inversion can progress from a recorded seismic trace to an estimated wavelet and an earth model of acoustic impedance.

As an example, forward modeling can take a model of formation properties (e.g., acoustic impedance as may be available from well logs) and combine such information with a seismic wavelength (e.g., a pulse) to output one or more synthetic seismic traces. As shown in FIG. 6, a block 612 can provide for output of a synthetic trace with primaries and multiples, a block 614 can provide for output of a synthetic trace with primaries and a block 616 can provide for output of a synthetic trace with multiples.

As to the data-driven modeling of multiples method 620, recorded seismic data 622 can be utilized with an input wavelet 624 to generate modeled seismic multiples 626. The adaptive subtraction of multiples method 640 can utilize the modeled seismic multiples 626 in generating a filter 646, as convolved with the modeled multiples, and then applying the filter (e.g., subtracting) to recorded data 644 to provide primaries 642. The primaries 642 are enhanced by attenuation of multiples in the recorded data 644. As mentioned, a process such as the XIMP™ process can utilize modeled multiples (e.g., from a data-driven method) to attenuate multiples in recorded data to thereby enhance primaries to facilitate interpretation of structures in a subsurface region that has been surveyed.

As an example, seismic data may be processed in a technique called "depth imaging" to form an image (e.g., a depth image) of reflection amplitudes in a depth domain for a particular target structure (e.g., a geologic subsurface region of interest). An image formed by depth imaging may be rendered to a display where a user may interpret the target structure using one or more features of a framework, which may provide for analyzing the image (e.g., image data) in an automated or semi-automated manner. Such a framework can include instructions to render one or more graphical user interfaces to a display where a user may manipulate one or more input devices operatively coupled to a computer or computing system to interact with the framework. As an example, a framework can provide for image analysis that can analyze a depth image or depth images to more particularly identify the shape, the boundary, the make-up, etc. of one or more subterranean features (e.g., rock, fluid, etc.). A target structure may be, for example, a reservoir that includes hydrocarbons where the boundary of hydrocarbons may be discerned via interactions with a framework, for example, as part of a workflow that may include identifying a region that include hydrocarbons, drilling a well to that region, and producing at least a portion of the hydrocarbons from the region via the well (e.g., as appropriated completed, etc.).

As an example, seismic data may be processed to obtain an elastic model pertaining to elastic properties of a geologic subsurface region. For example, consider elastic properties such as density, compressional (P) impedance, compression velocity ($v_p$)-to-shear velocity ($v_s$) ratio, anisotropy, etc. As an example, an elastic model can provide various insights as to a surveyed region's lithology, reservoir quality, fluids, etc.

An earthen formation can include layers of media (e.g., rock, etc.) where elasticity of the media may be isotropic, anisotropic or isotropic in certain aspects and anisotropic in others. As an example, crustal rock may be anisotropic yet transversely isotropic "TI" (e.g., locally polar anisotropic). Knowledge of isotropy, anisotropy, etc. can assist with, for example, planning and execution of exploration and development operations of a reservoir or reservoirs within a formation.

As mentioned, parameters that can characterize anisotropy of media (e.g., seismic anisotropy) can include one or more of the Thomsen parameters $\varepsilon$, $\delta$ and $\gamma$ (see, e.g., Thomsen, 1986).

Elastic properties of various types of rock may be approximated by so-called Vertical Transverse Isotropy (VTI or TI). Physical properties of a VTI material may be theoretically approximately identical when measured with respect to a direction known as the symmetry axis. In the case of many sedimentary rocks layering tends to be horizontal and the resulting symmetry axis is vertical. For such a system, the elastic stiffness tensor can be described using five elastic coefficients: $C_{11}$, $C_{33}$, $C_{44}$, $C_{66}$ and $C_{13}$. The foregoing five elastic coefficients correspond to coefficients of the stress tensor given a so-called "compact representation" (e.g., Voigt compact representation). As an example, a number of elastic coefficients may be selected based at least in part on type of anisotropy where, for example, the number may differ from five.

As an example, a workflow may include seismic migration and inversion. Such a workflow may include considering one or more anisotropies of one or more formations. For example, consider including orthorhombic anisotropy where a workflow includes receiving wide azimuth data (WAZ or WAz). WAZ involves seismic data acquisition where, for example, separate source vessels are used to record seismic reflections from areas out to the side of a recording spread (e.g., two or more vessels used simultaneously to increase the range of azimuths and offsets available for each shot gather in processing). As an example, WAZ data from a survey can provide for P-wave fracture characterization for a fractured reservoir and/or geomechanical studies around planned deepwater well locations as WAZ acquisition allows for application of amplitude variation with azimuth (AVAZ) techniques for processing and interpretation. WAZ surveying may be applied to an area of complex structural geology or where certain types of velocity contrasts exist (e.g., where salt causes imaging problems). WAZ may be suitable for areas in the Gulf of Mexico, the Aptian salt basin of the west coast of Africa, offshore Indonesia, the Red Sea, Brazil, etc.

As an example, a method can include inversion for fracture characterization. For example, a method can provide equations for an orthotropic system of symmetry that is appropriate for analysis of vertical transverse isotropy (anisotropic) rock layers that include swarms of aligned vertical fractures. Such an approach may include receiving full-azimuth seismic data. A seismic wave passing through a set of oriented fractures can undergo velocity variation and amplitude variation that varies with azimuth (VVAz and AVAz, respectively), which may be referred to as azimuthal anisotropy. As an example, an inversion may be performed that outputs values for anisotropy parameters that can be related to fractures (e.g., fracture density, orientation of a fracture symmetry axis, etc.) and that outputs probability information for the values.

As an example, a method can be a fast computational approach for 3D geometry-independent generalized internal multiples prediction. For example, such a method may be implemented for fast computations of internal multiples from seismic data within the eXtended Internal Multiples Prediction (XIMP™) method.

As an example, interbed multiples can arise through seismic reflections bouncing between closely spaced geological beds, resulting in multiples that have little, if any, velocity or moveout discrimination from the primaries that generated them. Extended internal multiple prediction, XIMP™, can be implemented as a data-driven demultiple algorithm, optionally with minimal a priori information. Such a technique may be suitable for one or more types of survey geometries.

The XIMP™ technology can handle various survey acquisition geometries and can, for example, predict multiples at true azimuth, which can be utilized for rich-azimuth land acquisition surveys. As an example, at least a portion of multiple energy may be removed from data using one or more adaptive subtraction techniques. As an example, XIMP™ technology may be used in conjunction with one or more 3D surface demultiple techniques in a manner that can provide, as a result, a better representation of primary energy.

Internal multiples may be predicted using XIMP™, for example, as presented in the equation below:

$$P_{IM}(x_r|x_s;t) = \int_{x_1} dx_1 \int_{x_2} dx_2 D_1(x_s|x_1;t) * D_2(x_1|x_2;t) \cdot D_3(x_2|x_r;t)$$

where $x_r$ represents the trace receiver location, $x_s$ represents the source location, $x_1$ represents the variable receiver location of traces with source at $x_s$ over which integration occurs, $x_2$ represents the variable source location of traces with receiver at $x_r$ over which integration occurs, t represents time, * represents correlation, • represents convolution. $D_2$ is the portion of the data representing the generating horizon, and it contains the event corresponding to the interface in the subsurface interpreted as an internal multiple generator. $D_2$ represents the multiple generator from input data having source or receiver at $x_1$ and receiver or source at $x_2$, and is achieved (in time domain) by muting out events except for the one selected as the internal multiple generator. $D_1$ represents input data having a source at $x_s$ and receivers at $x_1$, and contains a top mute of data with times shorter than or equal to a travel time for the event generator $D_2$. $D_3$ represents input data having a receiver at $x_r$ and sources at $x_2$, and contains a top mute of data with times shorter than or equal to a travel time for the event generator $D_2$. As an example, muting may be applied to an input dataset (see, e.g., Wu et al., Robust internal multiple prediction algorithm, expanded abstract, SEG annual meeting, San Antonio, Tex., 2011, which is incorporated by reference herein) or, for example, to intermediate results of the computation of the $P_{IM}$ integral above (Ikelle, U.S. Pat. No. 7,453,765, Scattering diagrams in seismic imaging, which is incorporated by reference herein).

In the above equation, $D_1$ and $D_3$ contain a set of recorded events such that each of the recorded events has a travel time longer than the travel time of the event generator (event in $D_2$). If the events in $D_1$ have travel times represented by the subscript i, the events in $D_3$ will be then represented with a subscript k, and the event in $D_2$ will be represented with the subscript j. An interpretation of the above equation would then lead to the prediction of internal multiples having travel times equal to $(t_i+t_k-t_j)$. As such, the travel times of the events in $D_1$ and $D_3$ are added together and the travel time from the event generator, $D_2$, is subtracted from the sum of the travel times of the events in $D_1$ and $D_3$. In general, the predicted travel times correspond to the actual travel times of true internal multiples in the data. The prediction of internal multiples may be generated by summing (integrating) over the correlation/convolution combinations of input data $x_s-x_1$, $x_r-x_2$, and $x_1-x_2$. In general, these combinations of traces result in different travel times $(t_i+t_k-t_j)$, but the appropriate travel time may dominate the "incorrect" combinations which tend to destructively interfere with each other.

After predicting the internal multiples for each of the horizons using the Extended Internal Multiple Prediction (XIMP™), each generated model of internal multiples for each horizon may include duplicate internal multiples that correspond to internal multiples of shallower horizons.

As explained, the XIMP™ method predicts internal multiples associated with specified generators of multiples. For each generator of multiples, the prediction of internal multiples is performed by computing an integration of the data over a 4D domain. Points in the 4D domain are formed as pairs of points within two 2D domains, for example, each domain being a rectangular "aperture".

The version of the XIMP™ method that implements integration over a 4D domain is referred to as full aperture XIMP™ and is computationally expensive and challenging to run in a production environment.

One approximation reduces the domain of integration to a 2D domain and is known as zero-crossline aperture XIMP™.

As an example, alternative approximations to the zero-crossline aperture XIMP™ method may be implemented. For example, consider algorithms that integrate over 3D domains and have properties in terms of quality of results and computational costs, which may be intermediate the full aperture and the zero-crossline aperture versions.

The selection of a computational method and its parameters may be performed by comparing the results of the approximate method versus the full-aperture method for appropriate subsets of the data and selected locations within a survey. The type of algorithmic approximation chosen and the parametrization may vary with location within the survey and with attributes of the seismic data such as for instance source-to-detector distance.

In the context of seismic surveying, multiple prediction can be performed by pre-stack wave extrapolation, which aims at prediction of energy associated with multiple reflections. While wave extrapolation methods demand some amount of knowledge of the subsurface, one or more alternative multiple prediction methods can be pursued in a data-driven manner with less subsurface information or without subsurface information.

Each internal multiple ray path (ray path that includes a downward reflection from an interface) can be decomposed into 3 primary components $(SX_1, X_1X_2, X_2R)$. Predicting internal multiples can involve identifying a full set of component traces; Source component $(SX_1)$, Generator component $(X_1X_2)$, Receiver component $(X_2R)$ on a grid.

In a "full" approach, without approximation as in a "fast" approach, full aperture internal multiple attenuation involves performing convolutions and cross-correlations for a full set of possible triplet combinations within a predefined grid centered along a trace azimuth. Performing the computations of the full set of possible triplet combinations is a very computationally intense process, which may lead to unattainable runtime and cost in a commercial processing project.

As an example, another approach, referred to as a fast approach, can process a triplet combination in a manner that offers improvement in computation run time and ability to increase crossline computation grid area allowing capturing of 3D effect improving multiple prediction timing.

As an example, a method can include identifying a grid of uniformly spaced surface points (related to a subsurface Downward Reflection Point (DRP)) centered at a target trace midpoint location where such a grid can vary with each target trace as it is shaped depending on, for example, target trace midpoint location (center of the grid); target trace offset (define grid extend along trace azimuth in junction with aperture value); and/or target trace azimuth (define grid azimuth from north).

In such a method, at each grid point, the method can include computing a desired midpoint, offset and azimuth for each of the triplet component trace (source component $(SX_1)$, generator component $(X_1X_2)$, and receiver component $(X_2R)$.

As an example, if a desired trace is not available, a computational algorithm as implemented by a system can find the closest trace by utilizing weights (e.g., defined by a user, default weights, computed weights, etc.). Weighting factors can include, for example, midpoint coordinates and/or offset and/or azimuth.

As an example, found traces can be shifted to a desired trace offset using differential moveout correction.

The aforementioned method can include convolving source/detector component traces after muting down to generator time followed by cross correlation generator component trace after muting around generator time.

In a full approach, the aforementioned method aims to repeat previous actions for each grid point within the grid in an effort to finding a full set of possible combination of component traces $(SX_1, X_1X_2, X_2R)$, of which the computational complexity increases by a quadratic factor depending on the grid size. Note that segments $(X_1, X_2)$ tend to have broad ranges of offset and azimuth values, for example, as allowed by the aperture grid (see, e.g., FIG. 9). In such a method, stacking of results can be performed via summing contributions from triplets $(SX_1, X_1X_2, X_2R)$.

As mentioned, an alternative approach can be a fast approximation approach, which can include some actions that may be common to the full approach; however, in the fast approximation one or more constraints may be applied (e.g., as geometry based selections, etc.). For example, consider the following constraint: generator component trace $(X_1, X_2)$ has substantially the same azimuth as the SR trace. In such an example, $(X_1, X_2)$ segments are substantially parallel to the SR segment that define the inline direction of the aperture (e.g., where inline directions are utilized; see, e.g., FIG. 10). Such an approach can be implemented as part of a full approach or as an alternative to a full approach. For example, results of the fast approach may be assessed to determine whether to take one or more actions associated with a full approach.

As an example, a fast approach may commence with a particular azimuth and then generate results that can be compared to results from a full approach, which may be limited to a particular region of a survey (e.g., a region selected to assess output of the fast approach). An assessment (e.g., a comparison) can guide a fast approach, for example, in determining whether to consider an additional azimuth. In such an example, a fast approach may commence with a single azimuth and then proceed, depending on acceptability of results, to one or more additional azimuths. A fast approach can be implemented in a manner that can generate results for one or more azimuths where the results for a plurality of azimuths is computationally less demanding than for a full approach. For example, a fast approach can generate results that compare favorably to a full approach while utilizing a number of azimuths that may be generally less than approximately 10 (e.g., consider an implementation that commences with 0 degrees, proceeds to 10 degrees, proceeds to 170 degrees, proceeds to 20 degrees, proceeds to 160 degrees, proceeds to 30 degrees, proceeds to 150 degrees, proceeds to 40 degrees, and proceeds to 140 degrees. In such an example, 9 azimuths are utilized with a range from 0 to 40 degrees and a range from 140 to 180 degrees. For regions with relatively planar reflectors (e.g., horizons), the azimuths neighboring 0 degrees and 180 degrees may provide more data-driven information than azimuths neighboring 90 degrees (e.g., equivalent to 270 degrees); noting that in certain geometries of subsurface structure(s), azimuths other than those close to a SR line may be relevant or more relevant.

As an example, a survey may be defined as including regions or sub-regions where a full approach may be performed for one or more regions while a fast approach is applied more broadly where one or more comparisons can be performed between the full and fast approaches. A selection of regions may be based in part on known or expected variations, complexities, etc., in subsurface structure. In such an example, a fast approach may be adapted with respect to number of azimuths and range or ranges of azimuths utilized for purposes of data-driven modeling of multiples.

As an example, an assessment or comparison may be based on, for example, results for a region of interest where multiples may have obscured primaries. For example, where the fast approach has adequately de-noised data of multiples (e.g., attenuated multiples), a workflow may continue with inversion, etc. based at least in part on the de-noised data. If, however, the de-noising is not sufficient, the workflow may continue with one or more actions of the full approach, which can be actions that extend beyond the one or more constraints such as the "substantially same azimuth" constraint. As additional actions are taken, results may be assessed to determine whether further actions are to be taken for further de-noising. As an example, a full approach may be implemented in a manner where the fast approach is implemented first. As mentioned, results from the fast approach can be intermediate results amenable to assessment for purposes of deciding whether to expend additional time and computation resources for further multiples attenuation.

As an example, multiple modeling can be performed by defining components such as wavefield components. For example, a method of multiple modeling can include defining three wavefield components, which can be two primary components $(S, X_1)$ and $(R, X_2)$ and another component $(X_1, X_2)$ where internal multiples can be predicted by convolving the two primary components and removing or correlating with the other component. In such an approach, a downward reflection point (DRP) can be a point on a reflector that is deemed to be an internal multiple generator (e.g., a multiple generating horizon, etc.). In the foregoing approach, the locations of $X_1$ and $X_2$ are not known a priori.

As an example, a method can include defining a grid within an aperture where, for a single target trace SR, SA and RB are convolved and then correlated with a trace AB for possible grid locations within the aperture to form a multiple contributing gather (MCG). The MCG can be stacked and the constructive and destructive interference of the traces gives the multiple model for the trace for a particular reflector. In such an approach, various multiple generating reflectors (e.g., horizons) are identified and a multiple model is created for each of the multiple generating reflectors. Where such a method includes predicting multiple models for more than one generator simultaneously, it can be referred to as the extended interbed multiple prediction (XIMP™) method.

In the XIMP™ method, a source-side trace (e.g., $(S, X_1)_i$) is convolved with possible receiver side traces (e.g., $(R, X_2)_j$, $(R, X_2)_{j+1}$, . . . ) and correlated with traces $X_{1,i}$, $X_{2,j}$ . . . , respectively, to form an inner MCG, MCG(X1,X2) for fixed X1 and the X2 locations. In such a method, the next source-side trace is chosen and the process of convolving and correlating is repeated, eventually forming a full MCG, MCG(X1,X2) for the X1 and X2 locations. An unstacked MCG can be visualized as a saddle shape where stacking inner MCGs forms the outer MCG and stacking the outer MCG generates the multiple model for the target trace. In such a method, the amount of computation depends on the number of DRPs for each target trace. For interbed multiples prediction, triplets of traces are convolved and correlated to produce the multiple model for each trace, where the number of triplets for each target trace increases exponentially with offset and aperture. As an example, an aperture along a dimension can be of the order of hundreds of meters or more.

As mentioned, an interbed demultiple workflow can proceed in a top down approach where multiple prediction and subtraction for a top interbed multiple generator occurs followed by a next deeper interbed multiple generator. As an example, an interbed multiples generator can be obtained from a horizon interpreted from a seismic image, which can be rendered to a display as part of an interpretation workflow that aims to build a model of a subsurface region. As an example, a generator may be a horizon itself or, for example, a set of parallel horizons within some time or depth interval, in which case the generator can be referred to as a "horizon-guided layer". As mentioned, XIMP™ can be performed in a manner where simultaneous prediction occurs. For example, computations for a first horizon can be saved in memory and used for each subsequent horizon. Output from such an approach is one multiple model for each generating horizon, except for the top horizon, noting that the multiple models are contaminated by artifacts or "multiples of multiple" due to a non-top-down approach. Given results (e.g., a set of multiples models), an adaptive subtraction method may be applied to separate artifacts followed by simultaneous adaptive subtraction using the separated models to get a final output. Simultaneous adaptive subtraction provides an ability to match each model in a window where results can take into account quality of each multiple model. As an example, a workflow can include data preconditioning, for example, to address one or more types of noise, to determine whether a seismic trace includes a sufficient amount of information (e.g., signal, etc.), etc.

Figure 7:
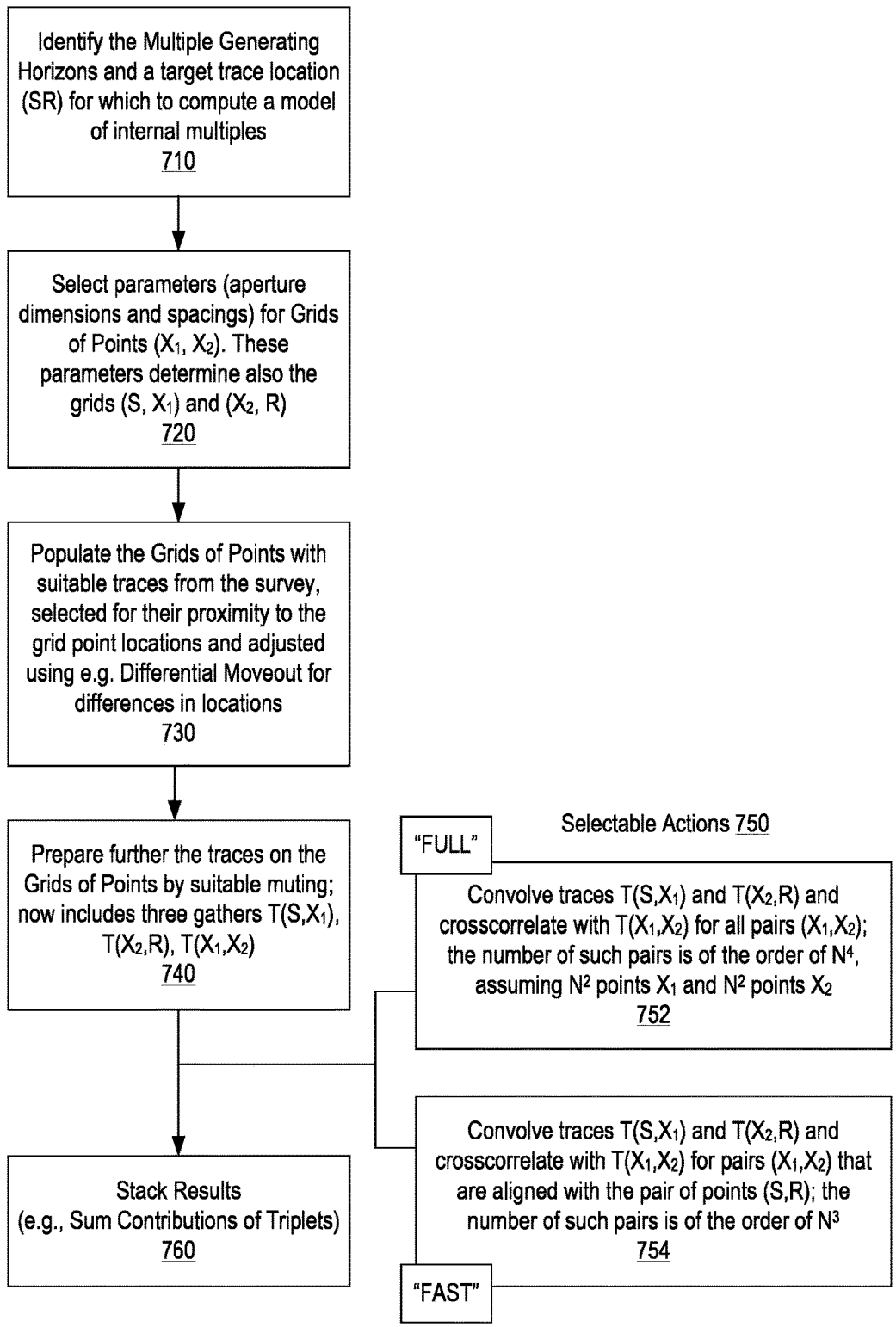
FIG. 7 illustrates an example of a method.

FIG. 7 shows an example of a method 700 that includes an identification block 710 for identifying multiple generating horizons (e.g., reflecting layers, interfaces, etc. in a subterranean environment) and a target trace location (SR) for which to compute a model of internal multiples; a selection block 720 for selecting parameters (e.g., aperture dimensions and spacings) for a grids of points (X1, X2) (e.g., parameters that can determine grids (S, $X_i$) and ($X_2$, R)); a population block 730 for populating the grids of points with suitable traces from a seismic survey, selected for their proximity to the grid point locations and adjusted (e.g., using differential moveout for differences in locations); a preparation block 740 for preparing further the traces on the grids of points by suitable muting to thereby generate (e.g., define) three gathers $T(S,X_1)$, $T(X_2,R)$, $T(X_1,X_2)$, which may be referred to as a triplet; and a selectable actions block 750 that includes, in the example of FIG. 7, a full approach block 752 and a fast approach block 754. In the example of FIG. 7, the full approach block 752 can provide for convolving traces $T(S,X_1)$ and $T(X_2,R)$ and cross-correlating with $T(X_1,X_2)$ for a full set of pairs $(X_1,X_2)$ where the full approach includes a number of such pairs that is of the order of $N^4$, assuming $N^2$ points $X_1$ and $N^2$ points $X_2$. In the example of FIG. 7, the fast approach block 754 can provide for convolving traces $T(S,X_1)$ and $T(X_2,R)$ and cross-correlating with $T(X_1,X_2)$ for a set of pairs $(X_1,X_2)$ where that set of pairs are selected based on one or more criteria such as, for example, pairs $(X_1,X_2)$ are substantially aligned with the pair of points (S,R) where the fast approach includes a number of such pairs that is of the order of $N^3$. In other words, the fast approach of block 754 has a number of pairs that is less than the order of $N^4$ and that can be of the order of $N^3$. As mentioned, a method may include commencing via a fast approach and then assessing results thereof to determined, based at least in part on the assessment, whether to proceed with one or more additional actions, which can include one or more actions of the full approach, for example, that have not already been taken via the fast approach. In such an example, the fast approach can be implemented as a first approach that can generate intermediate results of an overall approach that can optionally take one or more additional actions toward the full approach. Where additional intermediate results are generated and assessed, a method may terminate, for example, without having completed the full approach as associated with a full set of pairs.

Referring again to the method 700 of FIG. 7, a stack block 760 is shown for stacking results, for example, via a summation of contributions from triplets. As an example, the method 700 can be part of a workflow that includes, for example, inversion and characterization of one or more properties of a subterranean formation (e.g., a reservoir, a geobody, a horizon, etc.).

Figure 8:
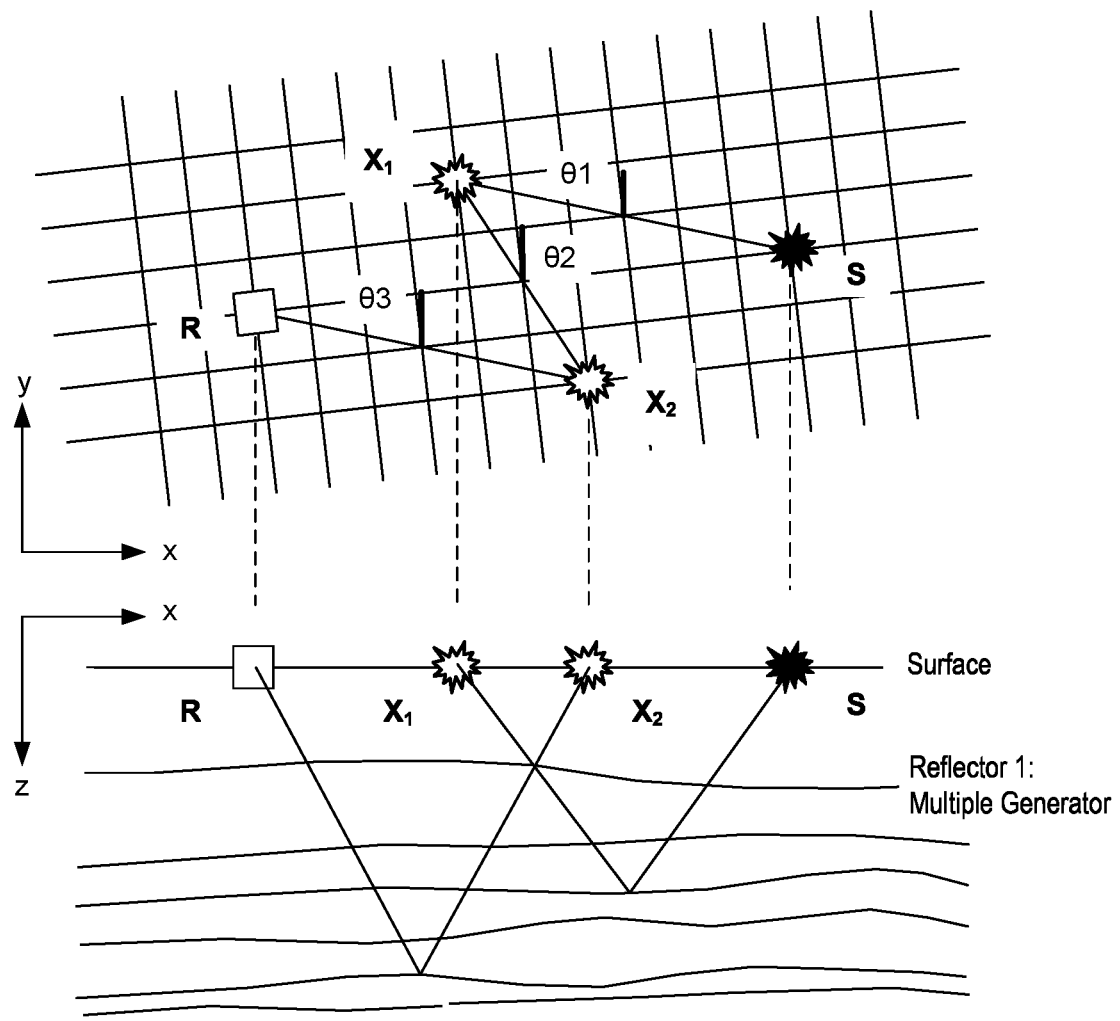
FIG. 8 illustrates an example of a survey technique.

FIG. 8 shows an example of a survey of a subsurface region that includes reflectors below a surface where equipment is located at the surface. In the example of FIG. 8, one of the reflectors is identified as being an internal multiple generator. For example, the source emits seismic energy that interacts with a reflector that generates a reflection where that reflection reflects off the identified internal multiple generator reflector, which causes energy to travel downwardly to another reflector and then upward from that reflector to the receiver.

The survey can be overlain with a grid, which can include points where the grid can be defined with respect to an inline direction and crossline direction as well as an azimuth that is an angle of rotation that can be defined with respect to the inline direction and/or the crossline direction.

Specifically, FIG. 8 shows a graphic of a spatial location of one triplet of traces ($SX_1$, $X_1X_2$, $X_2R$) participating in estimation (e.g., prediction) of internal multiples in target trace SR in the map view (top) and the section view (bottom). In FIG. 8, x and y are taken to be horizontal coordinate axes while z is vertical. The top view corresponds to a projection along z such that relationships between sources, receivers and azimuth angles can be defined in a plane (e.g., in an x, y coordinate system). As an example, a method can include processing that can account for variations in a vertical direction.

Various data-driven algorithms involve evaluation at the intersection points of lines of a regular rectangular grid; noting that obtaining seismic recordings with source and receiver locations at nodes is seldom guaranteed in practice. And, regularization is seldom considered as part of the established theory (e.g., it can be regarded as a free-standing problem).

Figure 9:
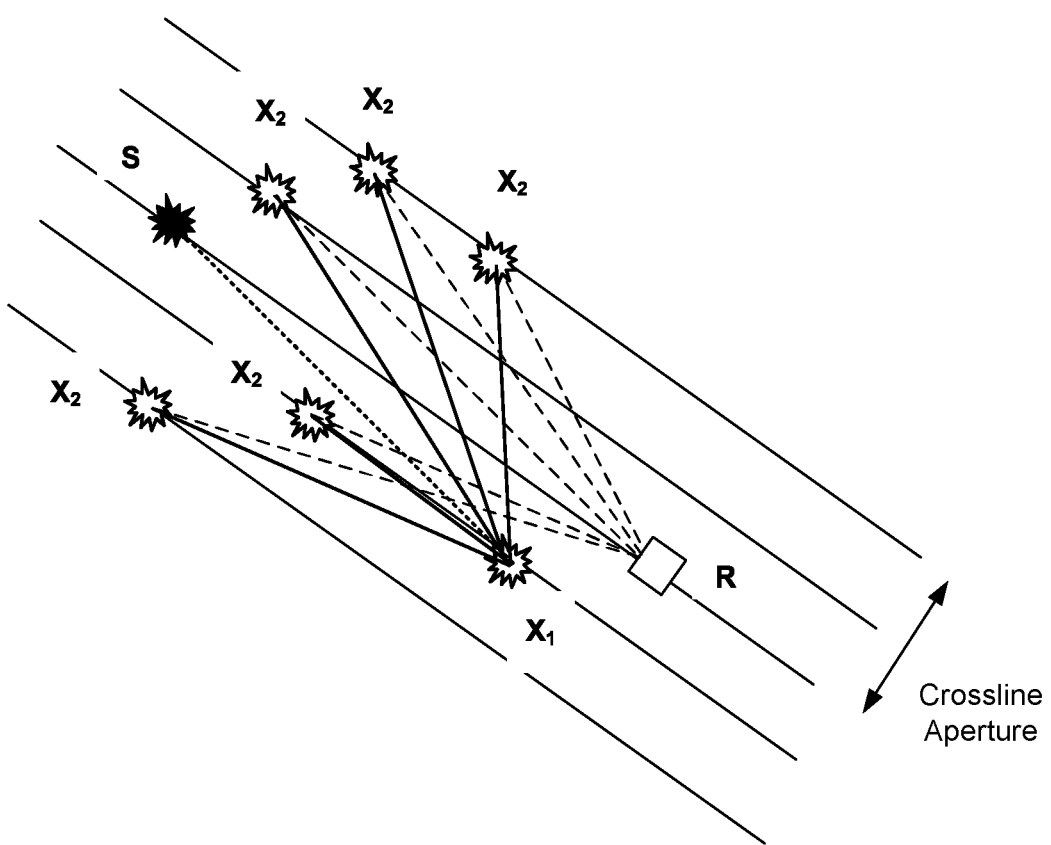
FIG. 9 illustrates an example of a method.

FIG. 9 shows a graphic of an XIMP™ full aperture approach with the generator component ($X_1$, $X_2$) along azimuths (e.g., as defined with respect to a line between S and R). As shown, the receiver (R) is linked with each of the $X_2$ positions and the source (S) is linked with each of the $X_1$ positions.

Figure 10:
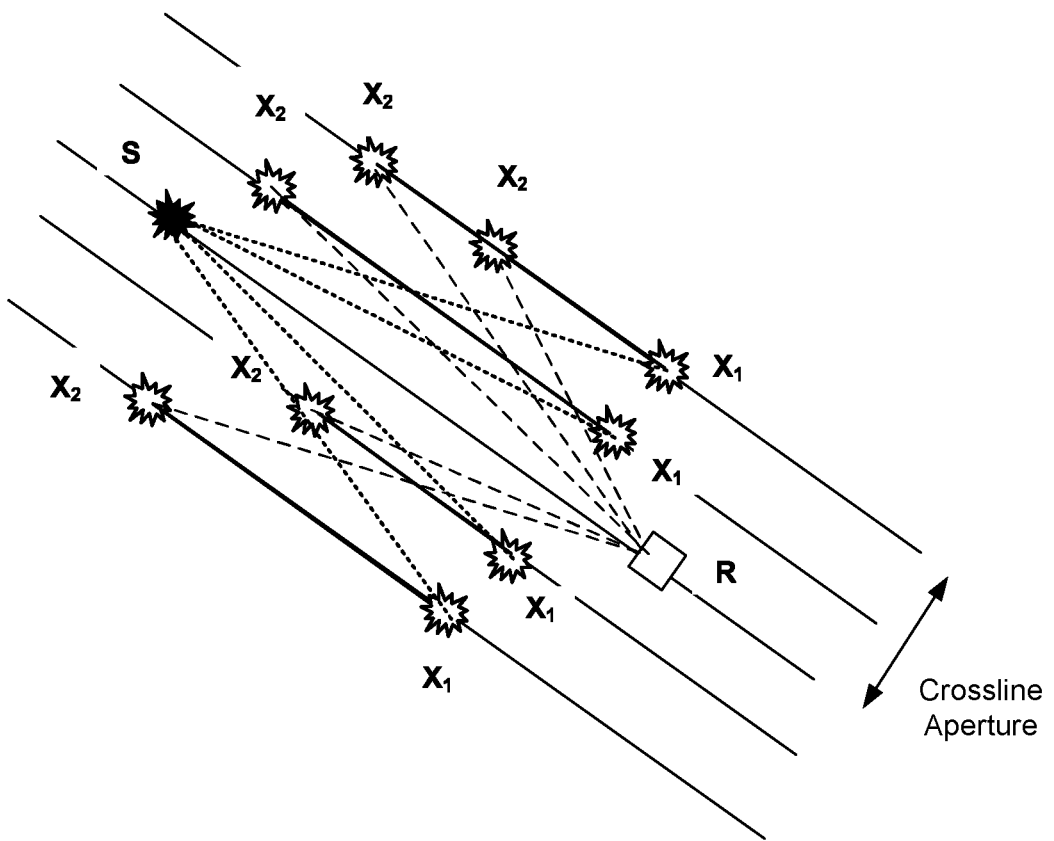
FIG. 10 illustrates an example of a method.

FIG. 10 shows a graphic of a fast XIMP™ full aperture approach with the generator component ($X_1$, $X_2$) constrained to the target trace (SR) azimuth such that the lines formed by pairs of the generator components are substantially parallel to one another.

In particular, FIGS. 9 and 10 show map views of the spatial locations of triplets of traces ($SX_1$, $X_1X_2$, $X_2R$) for the case of the XIMP™ full aperture approach (FIG. 9) and fast XIMP™ approximation full aperture approach with constraint on the azimuth of the ($X_1$, $X_2$) segment (FIG. 10).

Figure 11:
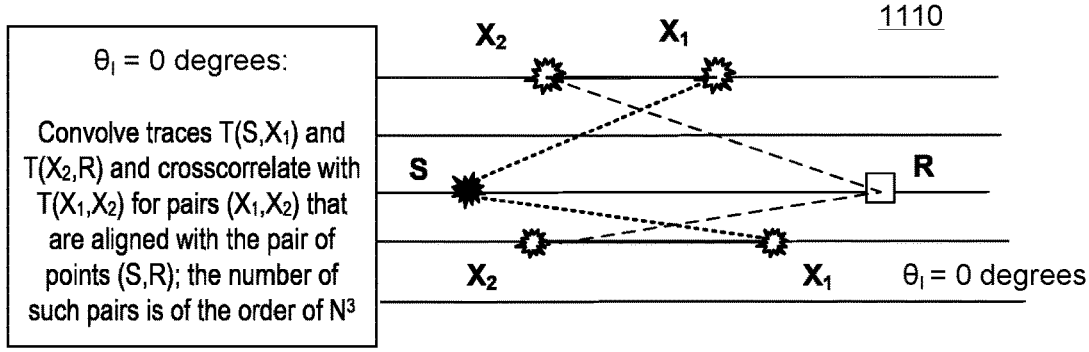
FIG. 11 illustrates an example of method.
Figure 11:
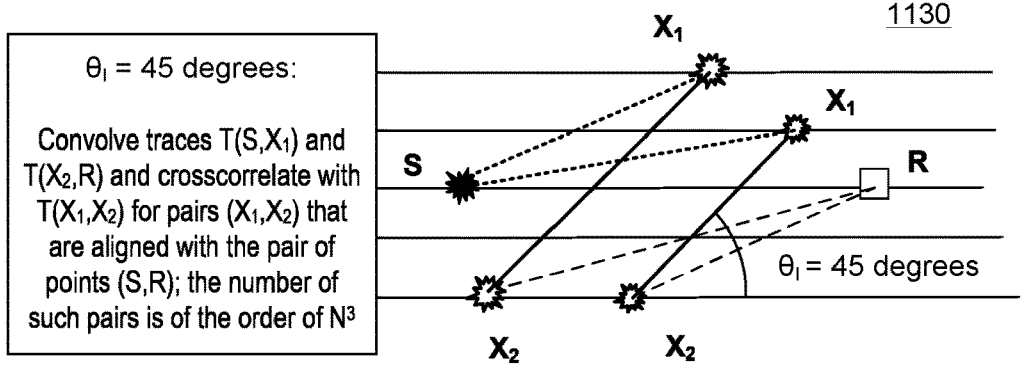
Figure 11:
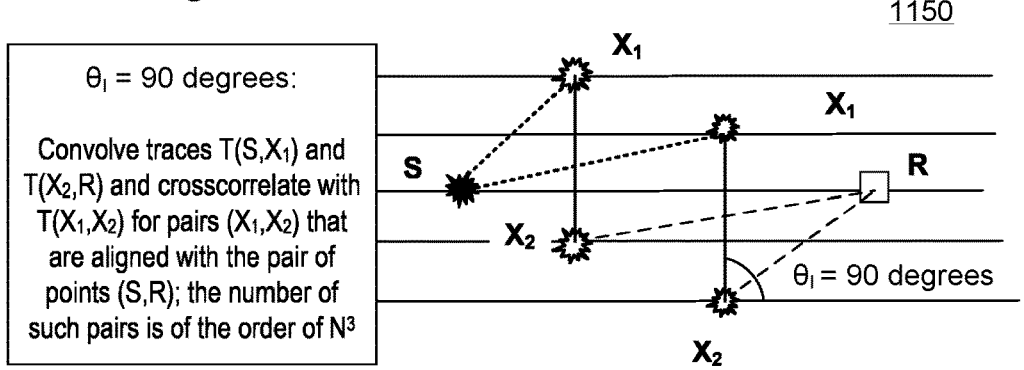

FIG. 11 shows an example of azimuth selection 1100 where a range of azimuths may be selected where the range may be defined and incremented according to a number of degrees for the range. For example, consider a range from an azimuth of 0 degrees to 90 degrees with an increment of 15 degrees. As an example, an increment may be fixed or variable. As to a variable azimuth, it may aim to select more azimuths closer to 0 degrees than closer to 90 degrees. As shown in FIG. 11, the azimuth can be defined as $\theta_l$, which is referenced with respect to a line between a source (S) and a receiver (R). As to the line between S and R, it may be defined with respect to an azimuth 8, as defined with respect to an inline direction of a crossline direction.

In FIG. 11, a scenario 1110 corresponds to $\theta_l$ equal to 0 degrees. As shown, the line segments from X1 and X2 are substantially parallel to each other and the line segment between S and R. Another scenario 1130 corresponds to $\theta_l$ equal to 45 degrees and yet another scenario 1150 corresponds to $\theta_l$ equal to 90 degrees. As indicated by ellipses, increments may occur between the scenarios. For example, consider 15 degrees, 30 degrees, 45 degrees, 60 degrees, 75 degrees and 90 degrees. As to being substantially parallel, consider two lines that are within a range of angles with respect to each other of approximately −5 degrees to approximately +5 degrees where parallel can be defines as 0 degrees. Variations may be due to one or more factors, which can include acquisition geometry related factors (e.g., variations in placement of sensors and/or receivers due to surface features, general placement procedures, etc.). As an example, one or more variations may be due to data and/or equipment that may be missing, lacking accuracy, faulty, momentarily inoperative, etc. As an example, a method can include interpolation and/or a nearest reliable neighbor approach as to a source, a receiver, data in a seismic data set, etc. As a seismic survey can span many meters, some amount of variation may be expected as to locations, positions, availability of data, etc. As to some examples of geometries and scale, consider various examples herein that provide values for apertures, whether inline or crossline. As to locations of sources and/or receivers, such equipment may be provided with location or positioning circuitry, which may, for example, be GPS-based or based on one or more other types of positioning systems.

In the example of FIG. 11, integration depends on $\theta_j$. A number of different angles may be selected where, as the number of angles increases, the number of computations increases. As an example, a method may consider a single azimuth (e.g., 0 degrees) or may consider a number less than approximately 20, or less than approximately 10 or less than approximately 5. Again, a number of azimuths may be within a selected range.

Examples of equations corresponding to the cases described above are provided below:

Full aperture XIMP™:

$$IM^{g_k}_{(x_s, y_s=0; x_r, y_r=0)} = \qquad \text{A-1}$$

$$\frac{1}{A} \int \int \int \int \tilde{S}^k_{(x_s, y_s; x_i, y_i)} \circledast \tilde{R}^k_{(x_j, y_j; x_r, y_r)} \otimes \tilde{G}^k_{(x_i, y_i; x_j, y_j)} dx_i dx_j dy_i dy_j.$$

where $\circledast$ indicates convolution and $\otimes$ indicates crosscorelation. We'll assume further that the x-axis is aligned with the source receiver direction, and therefore the crossline coordinates of the source and receiver are zero. Note that the vector $(x_i - x_j; y_i - y_j)$ appearing in $\tilde{G}^k_{(x_i, y_i; x_j, y_j)}$ can have a selected azimuth.

Fast computation XIMP™ with constraint on the azimuth of the generator term for internal multiple (k-th generator):

$$\overline{IM}^{g_k}_{(x_s, y_s=0; x_r, y_r=0)} = \qquad \text{A-2}$$

$$\frac{1}{A'} \int \int \int \tilde{S}^k_{(x_s, y_s; x_i, y_i)} \circledast \tilde{R}^k_{(x_j, y_j; x_r, y_r)} \otimes \tilde{G}^k_{(x_i, y_i; x_j, y_i)} dx_i dx_j dy_i,$$

where the constraint being $y_j = y_i$, that is azimuth of the vector $(x_i - x_j; y_i - y_j = 0)$ is aligned with the source-to-receiver (line SR) azimuth (e.g., noting that a constraint may be a predefined orientation with respect to a line defined by a source and a receiver; or, for example, another predefined orientation, etc.).

Zero-crossline aperture XIMP™ computation of internal multiple (k-th generator):

Constraint: $y_j = y_i = y_0 = 0$. \qquad A-3.

$$\hat{IM}^{g_k}_{(x_s, y_s=0; x_r, y_r=0)} =$$

$$\frac{1}{A''} \int \int \tilde{S}^k_{(x_s, y_s; x_i, y_0)} \circledast \tilde{R}^k_{(x_j, y_0; x_r, y_r)} \otimes \tilde{G}^k_{(x_i, y_0; x_j, y_0)} dx_i dx_j =$$

$$\frac{1}{A''} \int \int \tilde{S}^k_{(x_s; x_i)} \circledast \tilde{R}^k_{(x_j; x_r)} \otimes \tilde{G}^k_{(x_i; x_j)} dx_i dx_j,$$

As an example, the fast approach (e.g., as associated with the block 754 of FIG. 7) can be used to compute multiples, summing over one or more angles where for multiple angles, a range of angles or ranges of angles may be specified (e.g., a less than a full set approach); whereas, the full aperture XIMP™ result can be obtained by summation over the full range of azimuth angles (e.g., a full set approach).

As an example, partial results from fast computations can be displayed and analyzed as function of the azimuth of the generator component.

As mentioned, a selected target trace location may or may not be the location of a recorded trace in a survey. As an example, a method can include determining an appropriate trace, as recorded, that corresponds to the selected target trace location. As an example, a method can include analyzing a trace for primary energy and/or multiple energy. For example, a trace that includes no energy or energy below a threshold (e.g., below an amplitude threshold) may provide no to little contribution to a data-driven multiples model. Where a trace includes insufficient energy, a method may select another trace (e.g., another trace location).

As mentioned, a method can include generating a grid that includes points defined with respect to inline and crossline dimensions. A target trace location can correspond to a source location and a receiver location on the grid. For example, FIG. 8 shows a map view and a slice view with a receiver location and a source location where a trace can be identified as being associated with such locations where the trace can include data as recorded during a survey where the data are based on receipt of seismic energy by a receiver and can include primary energy and multiple energy.

As to an azimuth direction, a receiver location and a source location may define a reference angle (e.g., 0 degrees) from which an azimuth angle can be measured.

A source trace can be defined as a trace (e.g., as in ray tracing) between a source location and an $X_1$ location, for example, as illustrated in the map view and the slice view of FIG. 8.

A receiver trace can be defined as a trace (e.g., as in ray tracing) between a receiver location and an $X_2$ location, for example, as illustrated in the map view and the slice view of FIG. 8.

A generator trace can be defined as a trace (e.g., as in ray tracing) that is generated by a reflector, which can be an internal multiple generator reflector.

A source-to-receiver segment can be a segment that is defined by a source location and a receiver location.

As to an aperture, consider an area in a range of approximately 1 square kilometer or less to as large as 10 to 20 square kilometers or more. The aperture area tends to increase as the source-to-receiver distance (offset) increases. As an example, a crossline aperture can be in the range of approximately 0 km to approximately 1 km to approximately 5 km Trial results generated using a synthetics dataset are explained below, as computed by finite-difference modelling in a 3D earth model.

Figure 12:
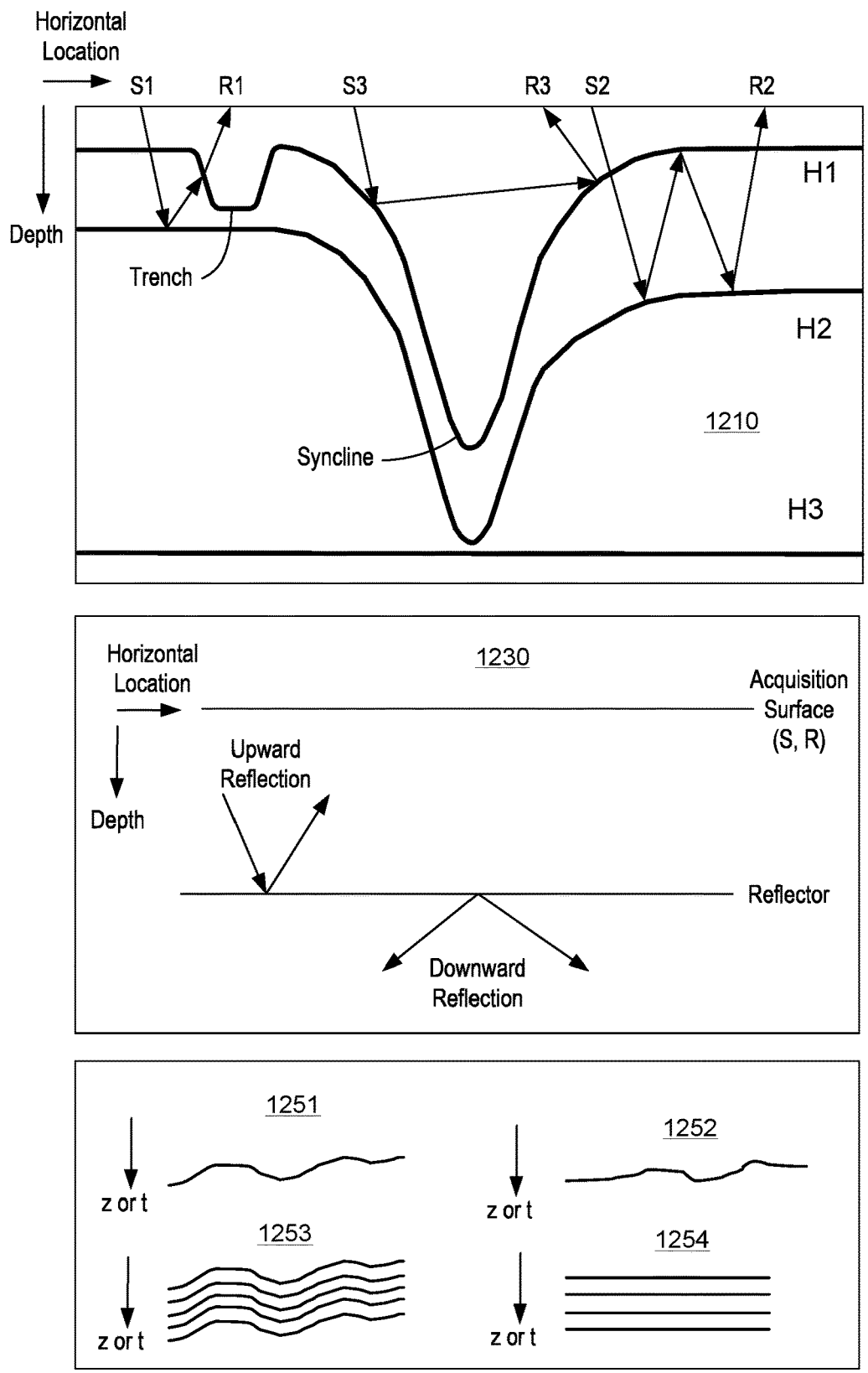
FIG. 12 illustrates an example of a velocity model of a subterranean environment that includes layers and layer boundaries that can reflect seismic energy, examples of various types of reflections and examples of various types of generators.

FIG. 12 shows a slice through an example of a velocity model 1210 that includes three interfaces and structural variations across the section. FIG. 12 also shows a schematic view of a slice 1230 with upward and downward reflections with respect to a reflector. The velocity model 1210 is shown in a simplified form, as the various layers can include some variations as to properties underlying velocity (e.g., elastic properties of material that effect how seismic energy interacts with the material).

As to H1, H2, H3 in the velocity model 1210, there represent reflectors in the subsurface. As shown, waves can propagate in the subsurface and experience changes in their propagation direction and amplitude at the locations of the reflectors. In FIG. 12, as to the slice 1230, the S1, R1 pair show a primary, primaries have one reflection in the subsurface; the S2, R2 pair show an interbed multiple, with downward reflection on H1 and upward reflections on H2. As to various methods herein, internal multiples can be considered to include at least one downward reflection.

As to the slice 1230, the S3, R3 pair is a prismatic reflection event. It is not a primary because it has two reflections (both on H1). Also, it is not an interbed multiple because it does not include a downward reflection.

As to the generators 1251, 1252, 1253 and 1254 of FIG. 12, these include: a generator, obtained from an interpreted horizon 1251 (e.g., consider an interpretation workflow that utilizes seismic data rendered as images to a display where picking may be performed that identifies features in one or more images as being associated with a generator); generators that may be patches of surfaces 1252; a generator, obtained as a layer of constant thickness following an interpreted horizon 1253; and a horizon and a layer at constant depth 1254. As indicated, data may be presented with respect to depth and/or time (e.g., consider trace data as acquired with respect to time).

A 5D synthetics dataset was computed utilizing the velocity model 1210, which is shown to include a trench and a syncline. Specifically, FIG. 12 shows a slice through the velocity model used to generate the 3D synthetics data. Note the three interfaces in the model: H1, H2 and H3. The three interfaces have a syncline feature in the middle of the section. The shallowest interface H1 has also a trench-like feature. These interfaces represent structural features of a subterranean environment. The shallow feature may be considered to be less complex than the syncline feature. Feature complexity can generate multiples that can confound interface identification and hence characterization of a subsurface environment, which may be or may include a fluid reservoir or reservoirs. As mentioned, a method can receive seismic data from a seismic survey using survey equipment and process at least a portion of that data in a manner that acts to attenuate multiples such that "cleaner" data are generated (e.g., data with a higher signal to noise ratio). From such data, inversion may be performed where features of the subsurface environment may be determined to thereby characterize that environment. As an example, the method 700 of FIG. 7 can be implemented to improve processing of digital seismic image data where, for example, the improvement can be with respect to processing time and/or processing resources. For example, a time saving may be of the order of one magnitude or more. Such an approach can be implemented via a specialized computing machine that includes instructions executable by one or more cores and associated memory, where the memory can be utilized in an effective manner to expedite processing. As mentioned below, with respect to FIG. 19, a full approach without fast approximation can encounter memory limitations. For example, a cluster can include processing nodes with associated memory where the memory available at each of the nodes is insufficient to handle computations expeditiously.

Results from the fast full aperture approach and the full aperture approach are presented in FIGS. 13, 14, 15, 16 and 17.

In various examples, data are evaluated numerically for integrals over 4D domains which are referred to as apertures. A method can, for example, implement numerical evaluation via quadrature rules. A quadrature rule can call for summing contributions from points within an aperture. Where a full set of points are utilized, the process can be referred to as "full aperture". In contrast, by summing contributions from some points within the aperture, it is possible to expedite processing or utilize lesser computational resources and to refer to such an approach (e.g., an approximation to the quadrature rule) as a "fast full aperture". Such an approach remains "full aperture" as it is applied to the defined aperture; however, with fewer points.

As an example, a method may be referred to as full quadrature (e.g., full application of the quadrature rule) and a method may be referred to as fast, approximate quadrature.

As an example, a method can include performing a summation over a subset of points within the aperture, the subset being defined by a Monte-Carlo sampling rule. Such an approach is described in Otnes et al., US 2011/0199858A1, entitled "Estimating internal multiples in seismic data", which is incorporated by reference herein.

As an example, a method can include an azimuth angle (e.g., a scalar) that can characterize points in a 4D aperture domain. In such an example, the integration can be rewritten as a summation over azimuth, then a 3D sub-domain. As explained with respect to FIG. 11, costs can be trimmed by appropriate selection of the azimuths being evaluated.

As shown in the results, differences tend to be small between the fast approach and the full approach (full aperture approach without approximation), which indicates that the fast approach can be utilized in scenarios where at least mild structural complexity exists.

Figure 13:
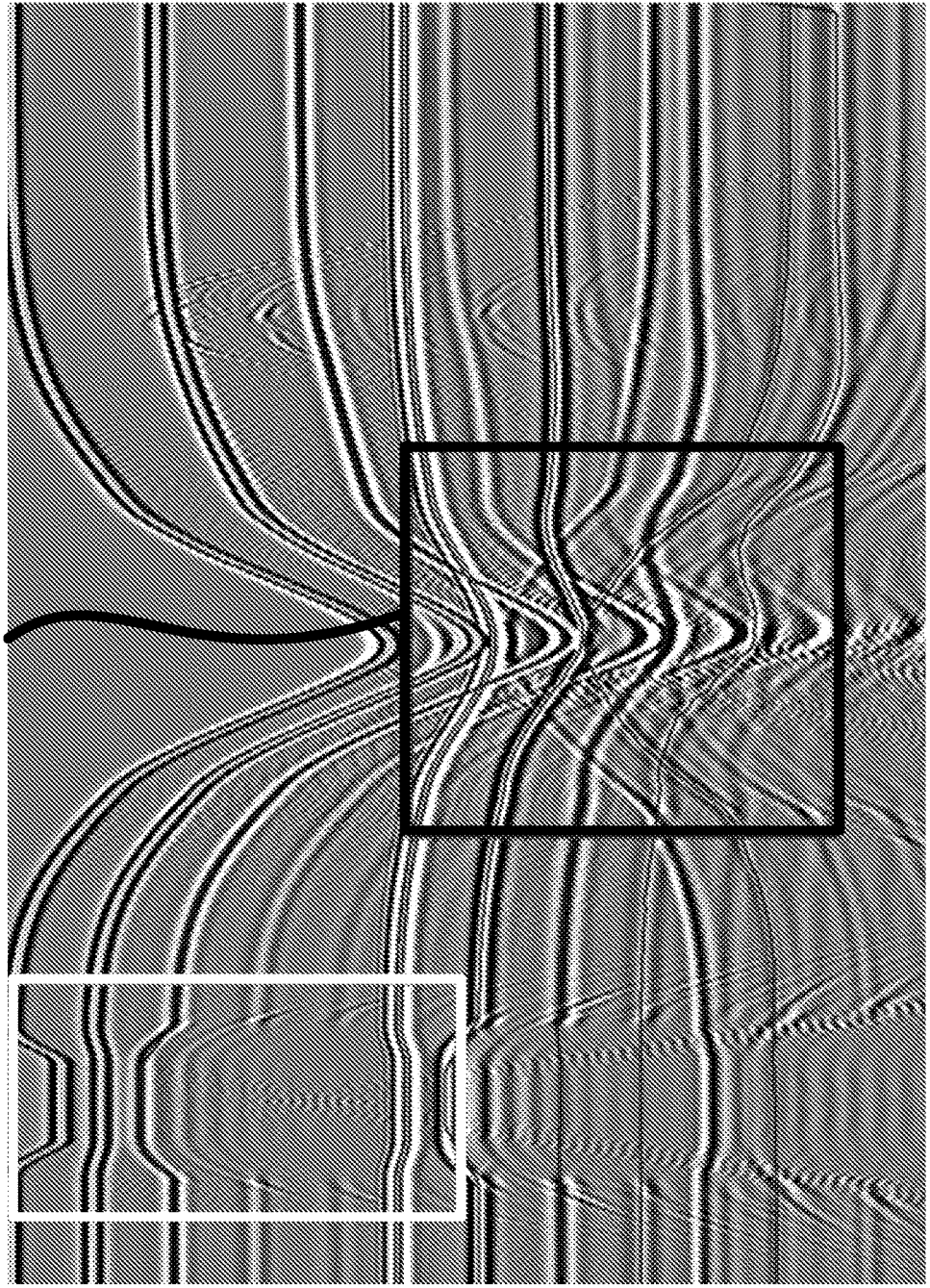
FIG. 13 illustrates examples of images based on processing of seismic data associated with the model of FIG. 12.

FIG. 13 shows a portion of a seismic image where features are identified that correspond to the velocity model 1210 of the underground of FIG. 12. In particular, the trench is identified and the syncline is identified. Results as to the trench are shown in FIG. 15 and results as to the syncline are shown in FIG. 16.

Figure 14:
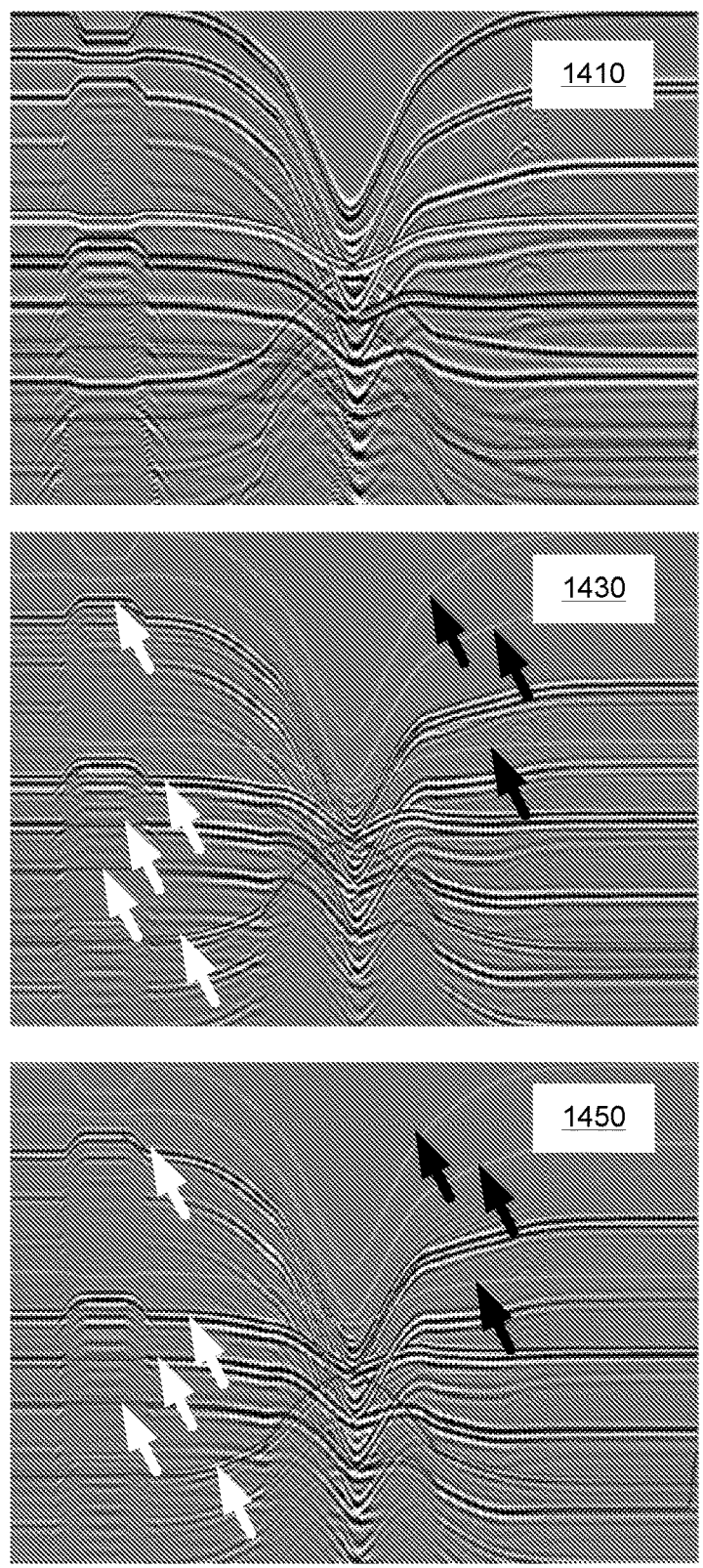
FIG. 14 illustrates examples of images of FIG. 13 based on processing of seismic data associated with the model of FIG. 12.

FIG. 14 shows example images 1410, 1430 and 1450. The image 1410 is the near offset section of the input data to the prediction of internal multiples (e.g., input seismic data). The image 1430 is the near offset section with prediction of internal multiples by the fast approach for a single azimuth. The image 1450 is the near offset section with prediction of internal multiples by the full approach, without approximations as in the fast approach. In FIG. 14, white arrows identify interbed multiples while black arrows identify primaries (see, e.g., explanations with respect to FIG. 12).

Figure 15:
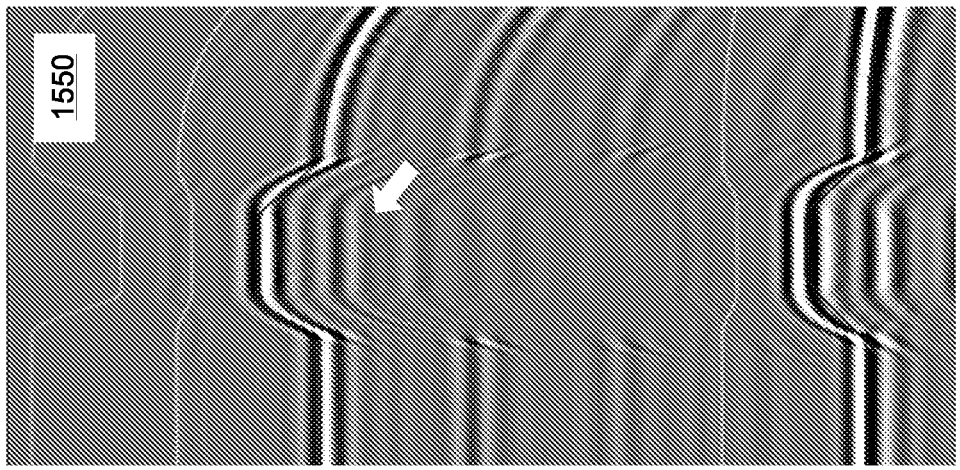
FIG. 15 illustrates examples of enlarged portions of the images of FIG. 14 based on processing of seismic data associated with the model of FIG. 12.
Figure 15:
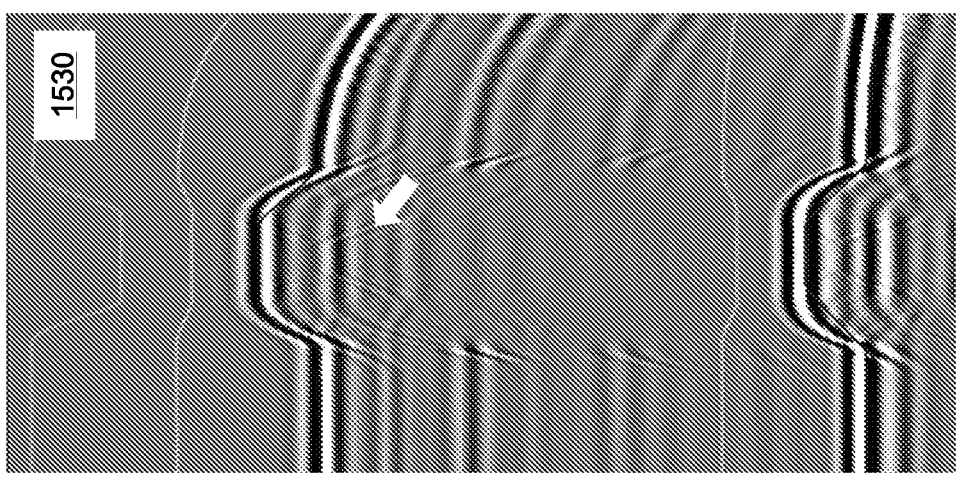
Figure 15:
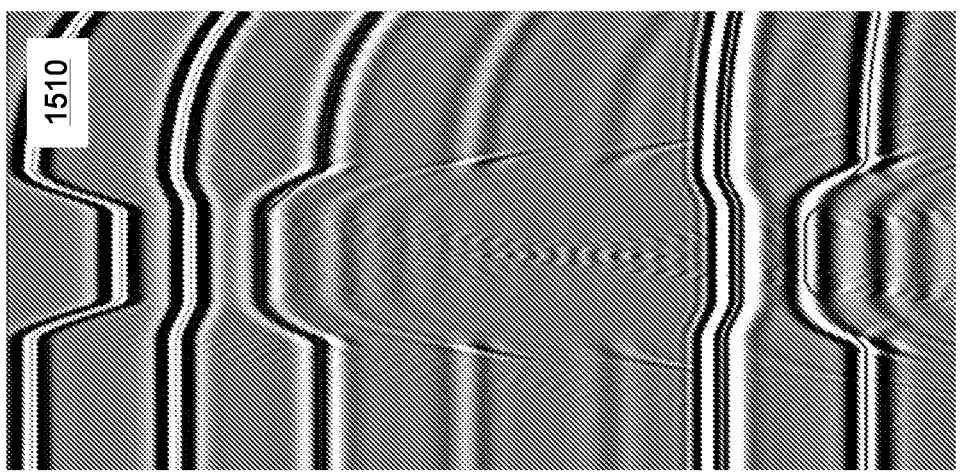

FIG. 15 shows example images 1510, 1530 and 1550 for the trench where the fast approach of the image 1530 can be compared with the full approach of the image 1550. As shown, the image 1530 compares favorably to the image 1550. A white arrow identifies a variation, which may be addressed by considering one or more additional azimuths. As an example, a method can include analyzing seismic data as to interbed multiples and determining whether to perform one or more iterations as to one or more additional azimuths in the fast approach (see, e.g., FIG. 11). As shown in FIG. 15, the shape of the variation is such that it does not distract from phenomena associated with the shape of the actual trench.

Figure 16:
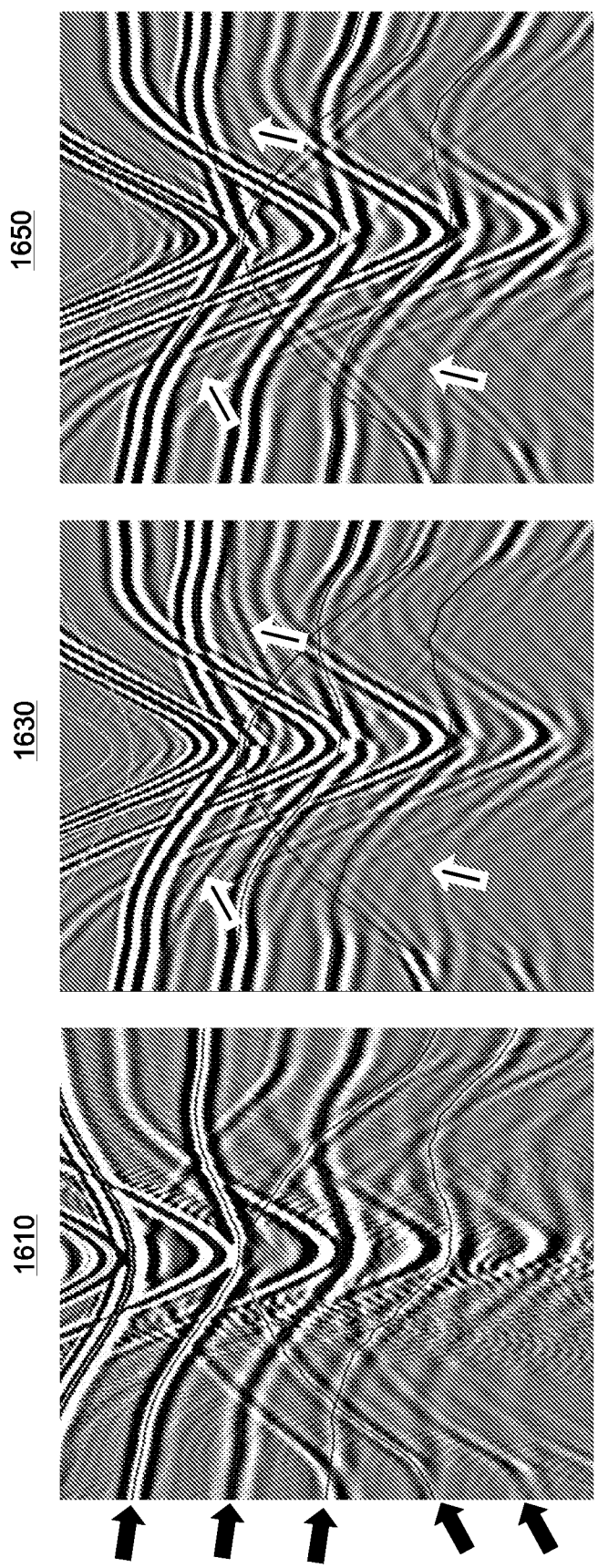
FIG. 16 illustrates examples of enlarged portions of the images of FIG. 14 based on processing of seismic data associated with the model of FIG. 12.

FIG. 16 shows example images 1610, 1630 and 1650 where black arrows identify interbed multiples and where white arrows identify several positions where some variations exist between the fast approach of the image 1630 and the full approach of the image 1650. As mentioned with respect to the trench analysis of FIG. 15, a method can include performing one or more additional azimuth iterations for a fast approach based at least in part on an analysis of results. As an example, a graphical user interface (GUI) may be rendered to a display with an image where a user may interact with the GUI to cause another iteration to be performed. In such an example, an input field or fields may be available for input of azimuth information (e.g., an azimuth as an angle, a range, etc.). Further, such a GUI can include a "go" or "continue" control that allows the user to iteratively proceed along a fast approach until results are suitable for purposes of interpretation, etc. Such interpretation can include, for example, identifying one or more features in a subsurface environment such as, for example, a reservoir.

Figure 17:
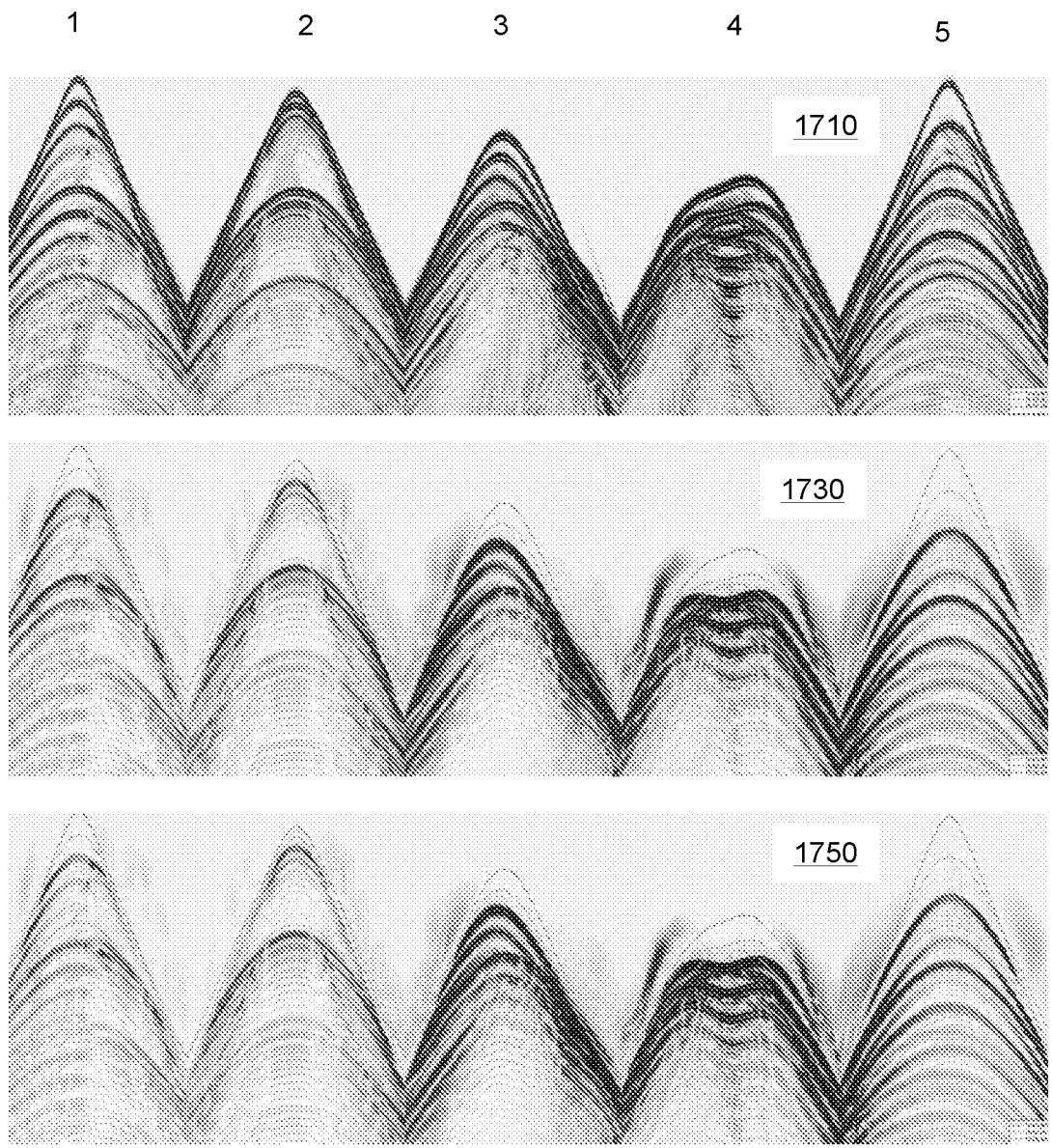
FIG. 17 illustrates examples of shot gathers.

FIG. 17 shows example images 1710, 1730 and 1750, which correspond to the input data, the fast approach and the full approach without approximation, respectively. Specifically, FIG. 17 shows shot gathers for input 1710, the fast full aperture computed XIMP™ internal multiples model 1730 and the full aperture computed XIMP™ internal multiples model 1750. In the images of FIG. 17, the gathers can be numbered from 1 to 5 from left to right where gathers 1, 2 and 5 have mild/moderate structure and where gathers 3, 4 have complex structure.

Figure 18:
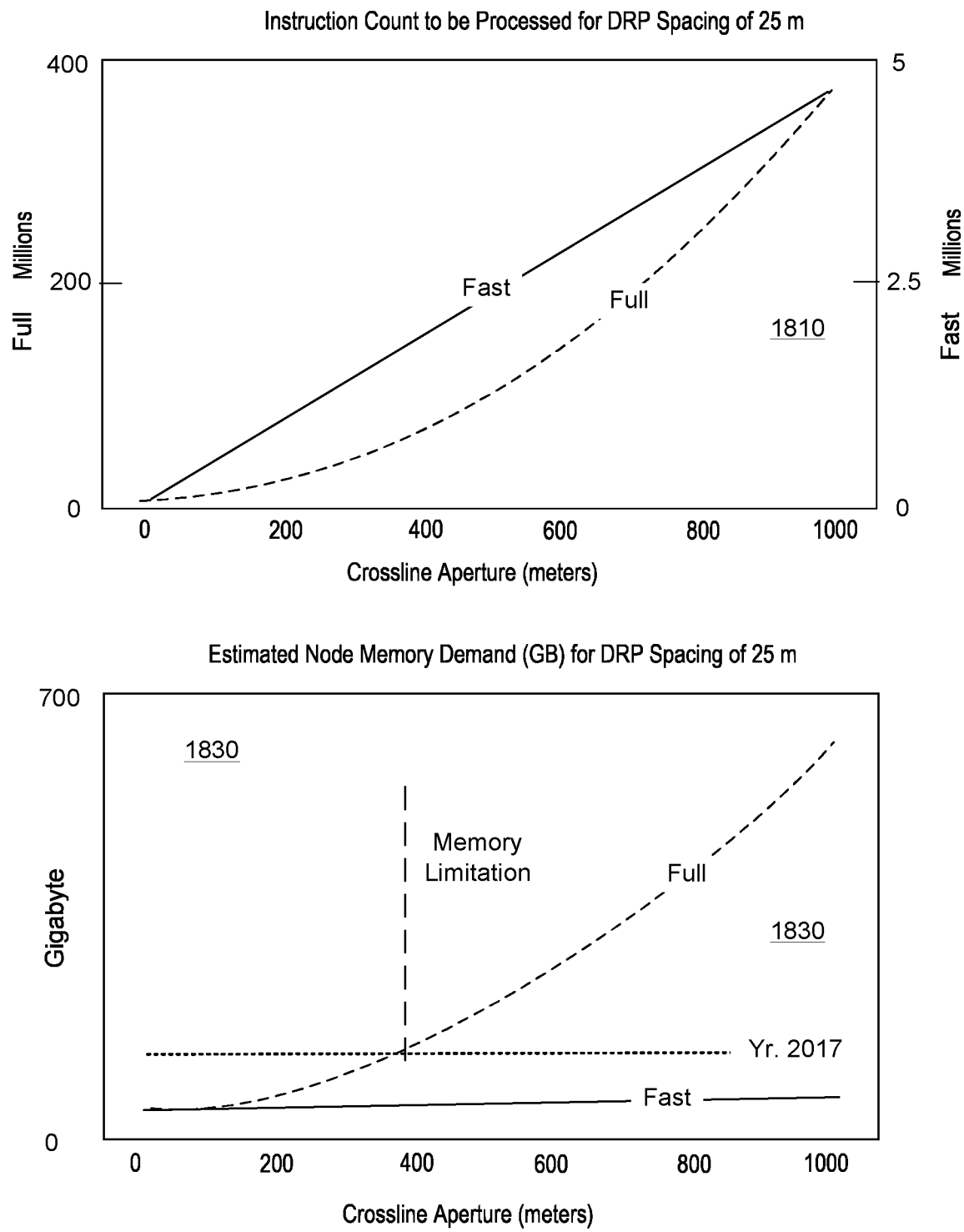
FIG. 18 illustrates example plots as to computational demands.

FIG. 18 shows example plots 1810 and 1830. In the plot 1810, the scale on the left hand side corresponds to the "Full" approach and ranges from 0 to 400 million while the scale on the right hand side corresponds to the "Fast" approach and ranges from 0 to 5 million. The data for the fast approach corresponds to a single azimuth. As mentioned, an approach may be implemented that includes utilizing less than approximately 20 azimuths with the fast approach. In such an example, the number of instructions to be processed may be approximately (depending on crossline aperture and spacing thereof) 2.5 million times 20, which is approximately 50 million. In such an example, the full approach would demand approximately 100 million. Where the crossline aperture is increased to approximately 1000 meters with the indicated spacing of 25 meters, the fast approach would be at about 100 million for 20 azimuths while the full approach would be at about 400 million. Where the number of azimuths is approximately 10, the difference would be 50 million (fast) versus 400 million (full), which is approximately one order of magnitude.

More particularly, the plot 1810 of FIG. 18 shows a graph as to number of instructions to be processed using different crossline aperture (0 to 1000 m) shown on the horizontal scale (inline aperture is 1000 m, inline DRP sampling and crossline sampling is 25 m, fast computation is plotted with scale on right side (0-5 million), while full computation is plotted with scale on left side (0-400 million).

As to the fast approach, it can be characterized as being linear while the full approach can be characterized as being nonlinear. The characterizations are illustrated by the shapes in the plot 1810 as to computations.

As to the plot 1830, it shows the estimated node memory demand in gigabytes, where a reference line indicates a node memory limit of about 128 GB for the year 2017 (e.g., what may be available for a machine). Specifically, the plot 1830 shows a graph of node memory demand to process different crossline apertures (e.g., from 0 to 1000 m), as shown on horizontal scale (where inline aperture is 1000 m, inline DRP sampling and crossline sampling is 25 m.

Field trials conducted in complex geological and acquisition settings demonstrated addition of crossline extent when predicting internal multiples, with fast XIMP™ that provided up to a 10 times speed-up while maintaining geophysical model quality.

The speed-up as a result of shifting from full aperture to fast computations can increase with the increase of crossline grid extent (e.g., fast computation can show speed-up of 10 times in small crossline aperture case while show 100 times speed-up with large crossline extent as illustrated in FIG. 18 (top)).

The cost of computing geometry-independent internal multiple predictions can be expressed as, for full aperture XIMP™ computation internal multiples prediction:

$$\left(\frac{A_i}{D_i}\right)^2 \times \left(\frac{A_c}{D_c}\right)^2 \times (2C_c + 3C_s + 3C_{DNMO})$$

And, for fast full aperture XIMP™ computation internal multiples prediction $$\left(\frac{A_i}{D_i}\right)^2 \times \left(\frac{A_c}{D_c}\right) \times (2C_c + 3C_s + 3C_{DNMO})$$

Where
$A_i$: Aperture along trace azimuth (inline aperture)
$A_c$: Aperture perpendicular to trace azimuth (crossline aperture)
$D_i$: Spatial sampling intervals along trace azimuth (inline DRP)
$D_c$: Spatial sampling intervals perpendicular to trace azimuth (crossline DRP)
$C_c$: Cost of the convolution/correlation between two traces.
$C_s$: Cost of the global search for one nearest neighbor trace per component trace
$C_{DNMO}$: Cost of DNMO per component trace Hardware configurations can impose a limitation on the grid extension along crossline direction (e.g., to about 250 m). In general, a very modest crossline term is used with the full aperture method, potentially limiting the ability to capture the real 3D effect of a complex internal multiple. Hardware memory capacity enable fast full aperture internal model computation with long spatial extent, a Red Sea offshore dataset was tested using 1500 m crossline extend, which adds for capture of real 3D effects. FIG. 18 includes example plots with corresponding data as to the full approach and the fast approach with respect to geometry.

As an example, a method can include receiving seismic data of a seismic survey of a subterranean environment, for example, where the seismic data are acquired via survey equipment that includes seismic energy sources and seismic energy receivers arranged according to a seismic survey geometry; identifying a target trace location of the seismic survey as a line defined by a seismic energy source location and a seismic energy receiver location where the target trace of the target trace location includes primary energy and multiple energy; selecting parameters that define points associated with the seismic survey geometry; defining a source trace, a receiver trace and a generator trace with respect to a pair of points of the defined points; for a set of pairs of points where each of the pairs is at a predefined orientation with respect to the line, convolving corresponding defined traces; and based at least in part on the convolving, generating seismic data with attenuated multiple energy. In such an example, the predefined orientation can be an orientation substantially parallel to the line or, for example, an orientation substantially perpendicular. As an example, a predefined orientation can be a predefined angle with respect to a line (e.g., as defined by a source location and a receiver location, etc.).

As an example, a method may include defining another orientation as a predefined orientation and repeating convolving. For example, consider repeating for another set of pairs of points that may not be within a prior set of pairs of points.

As an example, a method may be a fast method and may include assessing results and taking one or more actions toward a full method where the full method considers a set of pairs of points that exceeds a number of a set of pairs of points of the fast method. For example, the set of pairs of points of the fast method can be a subset that is generated according to one or more criteria such as a predefined orientation criterion.

As an example, a method can include a hierarchy of criteria. For example, a first criterion can be a predefined orientation this is substantially parallel to a line and a second criterion can be at a different predefined orientation to the line such as, for example, substantially perpendicular to the line. As an example, a two set of criteria may be two orthogonal directions to a line where one direction may be processed first followed by an assessment of results and, based on the assessment, deciding whether to proceed with the other direction. As an example, in a parallel processing computing system, the two orthogonal directions may be optionally processed in parallel.

As an example, a line defined by a source location and a receiver location can be utilized to define an azimuth.

As an example, a spacing between a line defined by a source location and a receiver location and a line defined by a pair of points can correspond to a cross-line aperture of a geometry of a seismic survey.

As an example, points can correspond to points of a grid. For example, a grid of points may be defined with respect to a seismic survey where points are selected from the grid of points according to one or more criteria, which may be one or more constraints. As an example, a criterion can be an orientation criterion where the orientation is defined with respect to a source location and a receiver location such as a line defined thereby (see, e.g., FIG. 11).

As an example, a generator trace can be defined by a pair of points. As an example, a generator trace can correspond to a generator that is a generator of interbed multiple reflections. As an example, such a trace may be referred to as a point trace that is defined at least in part by a pair of points.

As an example, a method can include points that include points in a plane that is a projection along a vertical direction of a seismic survey geometry. For example, a grid of points may correspond to a two-dimensional grid that is a projection along a direction of gravity as to an extent of a boundary of a seismic survey.

As an example, a method can include convolving a source trace and a receiver trace to generate a result and cross-correlating the result and a generator trace. As an example, such a generator trace can corresponds to a generator of multiples that contributes to the multiple energy. In such an example, the generator can be an interface in a subterranean environment.

As an example, a method can include muting seismic energy. For example, consider a method that includes muting to separate (e.g., split) seismic energy into reflections that occur above a generator and that occur below the generator.

As an example, at least a portion of seismic energy can corresponds to a W-shaped travel path where a first upper point of the W-shape corresponds to a source, a second upper point of the W-shape corresponds to a receiver, and where an intermediate point corresponds to a multiple generator as a structure in the subterranean environment. In such an example, a first lower point of the W-shape can correspond to a reflector that is deeper than the multiple generator and a second lower point of the W-shape can correspond to a reflector that is deeper than the multiple generator. In such an example, the reflectors as to the lower points can be the same structure (e.g., same horizon, etc.) or different structures (e.g., different horizons, etc.).

As an example, a method can include assessing attenuated seismic energy data and based at least in part on the assessing, deciding whether to alter a predefined orientation as a constraint and to process additional pairs of points that are not within a prior set of pairs of points.

As an example, a system can include a processor; memory accessible by the processor; and processor-executable instructions stored in the memory that are executable to instruct the system to perform one or more method described herein. Such instructions may provide for receipt of seismic data of a seismic survey of a subterranean environment, for example, where the seismic data are acquired via survey equipment that includes seismic energy sources and seismic energy receivers arranged according to a seismic survey geometry; identification of a target trace location of the seismic survey as a line defined by a seismic energy source location and a seismic energy receiver location where the target trace of the target trace location includes primary energy and multiple energy; selection of parameters that define points associated with the seismic survey geometry; definition of a source trace, a receiver trace and a generator trace with respect to a pair of points of the defined points; for a set of pairs of points where each of the pairs is at a predefined orientation with respect to the line, convolution of corresponding defined traces; and based at least in part on the convolution, generation of seismic data with attenuated multiple energy. As an example, such a system can include one or more data interfaces (e.g., network interfaces) and/or one or more displays. As an example, such a system can include control instructions that can issue one or more control commands (e.g., signals or other information) that can control one or more pieces of equipment.

As an example, one or more computer-readable storage media can include computer-executable instructions to instruct a system to perform one or more methods. Such instructions may provide for receipt of seismic data of a seismic survey of a subterranean environment, for example, where the seismic data are acquired via survey equipment that includes seismic energy sources and seismic energy receivers arranged according to a seismic survey geometry; identification of a target trace location of the seismic survey as a line defined by a seismic energy source location and a seismic energy receiver location where the target trace of the target trace location includes primary energy and multiple energy; selection of parameters that define points associated with the seismic survey geometry; definition of a source trace, a receiver trace and a generator trace with respect to a pair of points of the defined points; for a set of pairs of points where each of the pairs is at a predefined orientation with respect to the line, convolution of corresponding defined traces; and based at least in part on the convolution, generation of seismic data with attenuated multiple energy. A computer-readable storage medium is non-transitory, not a signal and not a carrier wave. Rather, a computer-readable storage medium is a physical device that can be considered to be circuitry or hardware.

Figure 19:
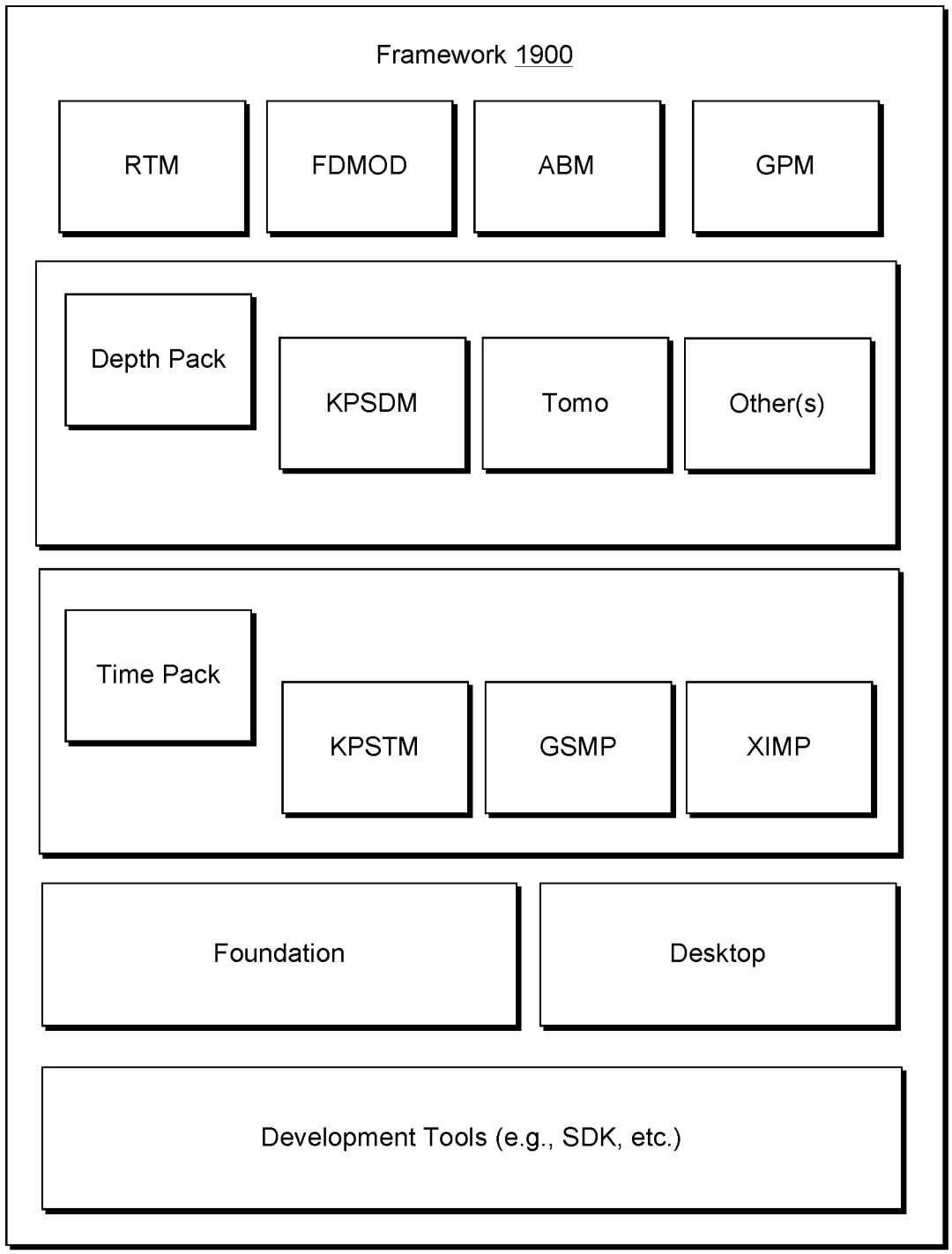
FIG. 19 illustrates an example of a computational framework.

FIG. 19 shows an example of a computational framework 1900 that can include one or more processors and memory, as well as, for example, one or more interfaces. The computational framework of FIG. 19 can include one or more features of the OMEGA framework (Schlumberger Limited, Houston, Tex.), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 19, the computational framework 1900 includes features for RTM, FDMOD, adaptive beam migration (ABM), Gaussian packet migration (GPM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP™)), framework foundation features, desktop features (e.g., GUIs, etc.), and development tools.

The framework 1900 can include features for geophysics data processing. The framework 1900 can allow for processing various types of data such as, for example, one or more of: land, marine, and transition zone data; time and depth data; 2D, 3D, and 4D surveys; isotropic and anisotropic (TTI and VTI) velocity fields; and multicomponent data.

The framework 1900 can allow for transforming seismic, electromagnetic, microseismic, and/or vertical seismic profile (VSP) data into actionable information, for example, to perform one or more actions in the field for purposes of resource production, etc. The framework 1900 can extend workflows into reservoir characterization and earth modelling. For example, the framework 1900 can extend geophysics data processing into reservoir modelling by integrating with the PETREL® framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 1900 may provide support for field to final imaging, to prestack seismic interpretation and quantitative interpretation, from exploration to development.

As an example, the FDMOD component can be instantiated via one or more CPUs and/or one or more GPUs for one or more purposes. For example, consider utilizing the FDMOD for generating synthetic shot gathers by using full 3D, two-way wavefield extrapolation modelling, the same wavefield extrapolation logic matches that are used by reverse-time migration (RTM). FDMOD can model various aspects and effects of wave propagation. The output from FDMOD can be or include synthetic shot gathers including direct arrivals, primaries, surface multiples, and interbed multiples. The model can be specified on a dense 3D grid as velocity and optionally as anisotropy, dip, and variable density. As an example, survey designs can be modelled to ensure quality of a seismic survey, which may account for structural complexity of the model. Such an approach can enable evaluation of how well a target zone will be illuminated. Such an approach may be part of a quality control process (e.g., task) as part of a seismic workflow. As an example, a FDMOD approach may be specified as to size, which may be model size. Such a parameter can be utilized in determining resources to be allocated to perform a FDMOD related processing task. For example, a relationship between model size and CPUs, GPUs, etc., may be established for purposes of generating results in a desired amount of time, which may be part of a plan (e.g., a schedule) for a seismic interpretation workflow.

The framework 1900 can include one or more sets of instructions that can be executable to perform one or more actions of a method such as the method 700 of FIG. 7. For example, the framework 1900 can include features that can perform one or both of the selectable actions 750 as to the blocks 752 and 754. As illustrated with respect to FIG. 11, the framework 1900 can allow for selection of one or more azimuths, which can be range of azimuths. The framework 1900 can include instructions that are executable to cause rendering of information to one or more displays where such information may be as an image. For example, a seismic image may be rendered to a display where the image is processed via a method that handles interbed multiples with respect to various interbed reflectors (e.g., interbed multiple generators).

Figure 20:
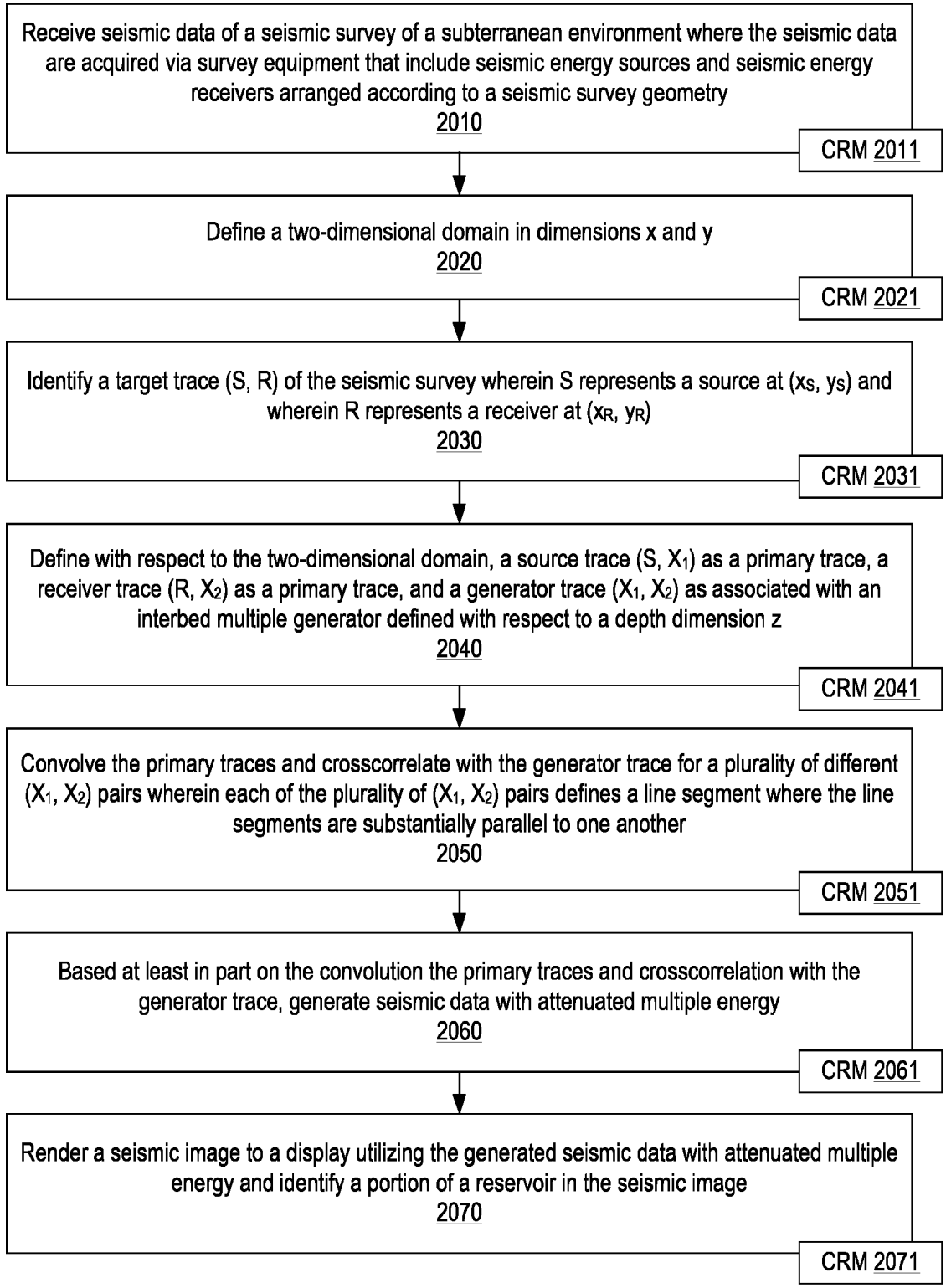
FIG. 20 illustrates an example of a method.

FIG. 20 shows an example of a method 2000 that includes a reception block 2010 for receiving seismic data of a seismic survey of a subterranean environment where the seismic data are acquired via survey equipment that includes seismic energy sources and seismic energy receivers arranged according to a seismic survey geometry; a definition block 2020 for defining a two-dimensional domain in dimensions x and y; an identification block 2030 for identifying a target trace (S, R) of the seismic survey where S represents a source at ($x_S$, $y_S$) and where R represents a receiver at ($x_R$, $y_R$); a definition block 2040 for defining with respect to the two-dimensional domain, a source trace (S, $X_1$) as a primary trace, a receiver trace (R, $X_2$) as a primary trace, and a generator trace ($X_1$, $X_2$) as associated with an interbed multiple generator defined with respect to a depth dimension z; a computation block 2050 for convolving the primary traces and crosscorrelating with the generator trace for a plurality of different ($X_1$, $X_2$) pairs where each of the plurality of ($X_1$, $X_2$) pairs defines a line segment where the line segments are substantially parallel to one another; and a generation block 2060 for, based at least in part on the convolving the primary traces and crosscorrelating with the generator trace, generating seismic data with attenuated multiple energy. As shown, the method 2000 can include a render and identify block 2070 for rendering a seismic image to a display utilizing the generated seismic data with attenuated multiple energy and for identifying a portion of a reservoir in the seismic image. In such an example, the identified portion of the reservoir can be a target where a drilling operation is performed to drill a well to that target. In such an example, the well can be utilized to produce fluid from the reservoir.

The method 2000 is shown in FIG. 20 in association with various computer-readable media (CRM) blocks 2011, 2021, 2031, 2041, 2051, 2061 and 2071. Such blocks generally include instructions suitable for execution by one or more processors (or cores) to instruct a computing device or system to perform one or more actions. While various blocks are shown, a single medium may be configured with instructions to allow for, at least in part, performance of various actions of the method 2000. As an example, a CRM block can be a computer-readable storage medium that is non-transitory, not a carrier wave and not a signal. As an example, such blocks can include instructions that can be stored in memory and can be executable by one or more of processors. As an example, the framework 1900 of FIG. 19 can include one or more of the CRM blocks 2011, 2021, 2031, 2041, 2051, 2061 and 2071 of FIG. 20. The framework 1900 can include multiple cores, which may be defined as nodes where each node includes associated memory. As an example, a system such as the system 350 of FIG. 3 may be utilized to perform a method such as the method 2000 of FIG. 20. For example, the instructions 370 can include one or more of the CRM blocks 2011, 2021, 2031, 2041, 2051, 2061 and 2071 of FIG. 20.

As an example, the method 2000 can improve the operation of a machine that processes seismic data. For example, the machine can operate in a manner that processes seismic data an order of magnitude faster than a machine that operates according to the full approach. As illustrated, the fast approach can, for a number of azimuths less than approximately 10 azimuths, attenuate multiple energy in seismic data with approximately one order of magnitude fewer computations than the full approach. Additionally, as indicated, the full approach can be limited by the physical availability of memory, for example, as in memory per node of a machine that is a computing cluster machine.

As an example, a method can include defining an aperture where the points are within the aperture (e.g., where the source trace, the receiver trace and generator trace are within the aperture).

As an example, a method can include muting the source, receiver and generator traces prior to convolving. As an example, a muting operation can be performed to isolate deep reflections on source trace and receiver trace and shallow reflections on generator trace with respect to an interbed multiple generator.

As an example, a method can include integrating, which may be part of generating seismic data with respect to interbed multiples. For example, consider the generating of the method 2000 as involving summation of results for pairs X1 and X2 such as summing over X1 and X2 pairs. Such an approach can be applied for one or more azimuths.

As an example, line segments can be substantially parallel to a line segment between $(x_S, y_S)$ and $(x_R, y_R)$, for example, as shown in FIG. 10 and FIG. 11. As an example, a crossline and inline geometry (e.g., coordinate system) may differ from the coordinate system (e.g., two-dimensional domain) of a source and a receiver. In such an example, the source and receiver may be defined with respect to an azimuth with the crossline and inline geometry as a reference (e.g., acquisition geometry of a seismic survey as a reference). As an example, with respect to selection of azimuths, which may be for iterations, the line segment between $(x_S, y_S)$ and $(x_R, y_R)$ can define a reference azimuth.

As an example, in a method, the plurality of $(X_1, X_2)$ pairs can define a first set of pairs and such a method can include performing convolving and crosscorrelating for a second set of a plurality of different $(X_1, X_2)$ pairs where each of the plurality of $(X_1, X_2)$ pairs of the second set defines a line segment where the lines segments are substantially parallel to one another and at an angle with respect to the line segments of the first set. In such an example, the angle can be an azimuth defined with respect to the line segment between $(x_S, y_S)$ and $(x_R, y_R)$. As an example, a method can include repeating the convolving and crosscorrelating for at least a third set at another, different angle with respect to the line segments of the first set. In such an example, based at least in part on the convolving the primary traces and crosscorrelating with the generator trace, can include generating seismic data with attenuated multiple energy. As an example, a first set, a second set and a third set can correspond to different angles in a range of angles.

As an example, a method can include rendering an image to a display utilizing the seismic data with attenuated multiple energy. In such an example, a method can include identifying a portion of a reservoir in the image.

As an example, a method can include utilizing a two-dimensional domain that defines a grid of points in the dimensions x and y where the grid of points is rotated from an inline direction of the seismic survey by an azimuth ($\theta$).

As an example, a method can include an interbed multiple generator defined by one or more depths in a depth dimension z that is a first interbed multiple generator. In such an example, a method can include selecting a second, different interbed multiple generator defined by one or more depths in a depth dimension z and repeating the method for the second, different interbed multiple generator. In such an example, the method can include selecting a third, different interbed multiple generator defined by one or more depths in a depth dimension z and repeating the method for the third, different interbed multiple generator.

As an example, an interbed multiple generator may be separated from another interbed multiple generator in a region. For example, one or more layers may separate the interbed multiple generators. As illustrated in the example of FIG. 12, a velocity model can account for material properties in layers where such layers include one or more interbed multiple generators. As an example, depth of an interbed multiple generator can differ with respect to an overlying acquisition geometry grid (e.g., in dimensions x and y) or a grid of points (e.g., in dimensions x and y). As indicated in FIG. 12, the velocity model can include various features that are defined with respect to a depth dimension z. As an example, a three-dimensional domain can include dimensions x, y and z where values for those dimensions can specify a point in the three-dimensional domain. As mentioned, time may be a proxy for depth, for example, where trace data are acquired with respect to time during a seismic data acquisition survey, the trace data may be stored in vectors or arrays where sequential values correspond to sampling times and where energy from deeper reflectors can be sensed at sampling times that are later than energy from shallower reflectors.

As an example, a system can include a processor; memory accessible by the processor; and processor-executable instructions stored in the memory that are executable to instruct the system to: receive seismic data of a seismic survey of a subterranean environment where the seismic data are acquired via survey equipment that includes seismic energy sources and seismic energy receivers arranged according to a seismic survey geometry; define a two-dimensional domain in dimensions x and y; identify a target trace (S, R) of the seismic survey where S represents a source at $(x_S, y_S)$ and where R represents a receiver at $(x_R, y_R)$; define with respect to the two-dimensional domain, a source trace (S, $X_1$) as a primary trace, a receiver trace (R, $X_2$) as a primary trace, and a generator trace $(X_1, X_2)$ as associated with an interbed multiple generator defined with respect to a depth dimension z; convolve the primary traces and crosscorrelate with the generator trace for a plurality of different $(X_1, X_2)$ pairs where each of the plurality of $(X_1, X_2)$ pairs defines a line segment where the line segments are substantially parallel to one another; and, based at least in part on the convolution of the primary traces and crosscorrelation with the generator trace, generate seismic data with attenuated multiple energy. In such an example, the line segments may be substantially parallel to a line segment between $(x_S, y_S)$ and $(x_R, y_R)$ (e.g., for an azimuth of zero; $\theta_I$ is approximately 0 degrees). As an example, a line segment between $(x_S, y_S)$ and $(x_R, y_R)$ can define a reference azimuth, which may be with respect to an acquisition geometry grid (e.g., of a seismic survey).

As an example, a plurality of $(X_1, X_2)$ pairs can defines a first set of pairs and a system can include instructions to convolve for a second set of a plurality of different $(X_1, X_2)$ pairs where each of the plurality of $(X_1, X_2)$ pairs of the second set defines a line segment where the lines segments are substantially parallel to one another and at an angle with respect to the line segments of the first set (see, e.g., the examples of FIG. 11). As an example, an angle can be an azimuth (e.g., $\theta_I$) defined with respect to a line segment between $(x_S, y_S)$ and $(x_R, y_R)$.

As an example, one or more computer-readable storage media can include computer-executable instructions to instruct a system to: receive seismic data of a seismic survey of a subterranean environment where the seismic data are acquired via survey equipment that includes seismic energy sources and seismic energy receivers arranged according to a seismic survey geometry; define a two-dimensional domain in dimensions x and y; identify a target trace (S, R) of the seismic survey where S represents a source at $(x_S, y_S)$ and where R represents a receiver at $(x_R, y_R)$; define with respect to the two-dimensional domain, a source trace (S, $X_1$) as a primary trace, a receiver trace (R, $X_2$) as a primary trace, and a generator trace $(X_1, X_2)$ as associated with an interbed multiple generator defined with respect to a depth dimension z; convolve the primary traces and crosscorrelate with the generator trace for a plurality of different $(X_1, X_2)$ pairs where each of the plurality of $(X_1, X_2)$ pairs defines a line segment where the line segments are substantially parallel to one another; and, based at least in part on the convolution of the primary traces and crosscorrelation with the generator trace, generate seismic data with attenuated multiple energy.

As mentioned, seismic data with attenuated multiples can improve a seismic imaging process, which can generate digital images of a subsurface region based on, for example, elastic properties of material in the subsurface region, which can be in one or more layers where material in each layer differs. An improved digital image process can facilitate identification of features in a subsurface region such as a reservoir that includes fluid that can be produced via a well drilled into the reservoir. As an example, a workflow can include acquiring seismic data, processing seismic data, rendering a seismic image to a display, identifying a reservoir in the seismic image, based on such an identification drilling to the reservoir to form a well, and producing fluid from the reservoir via the well. Such a technological process may aim to increase contact between the well and the reservoir such that the well is more productive with respect to its ability to produce fluid from the reservoir (e.g., drain the reservoir, etc.).

Figure 21:
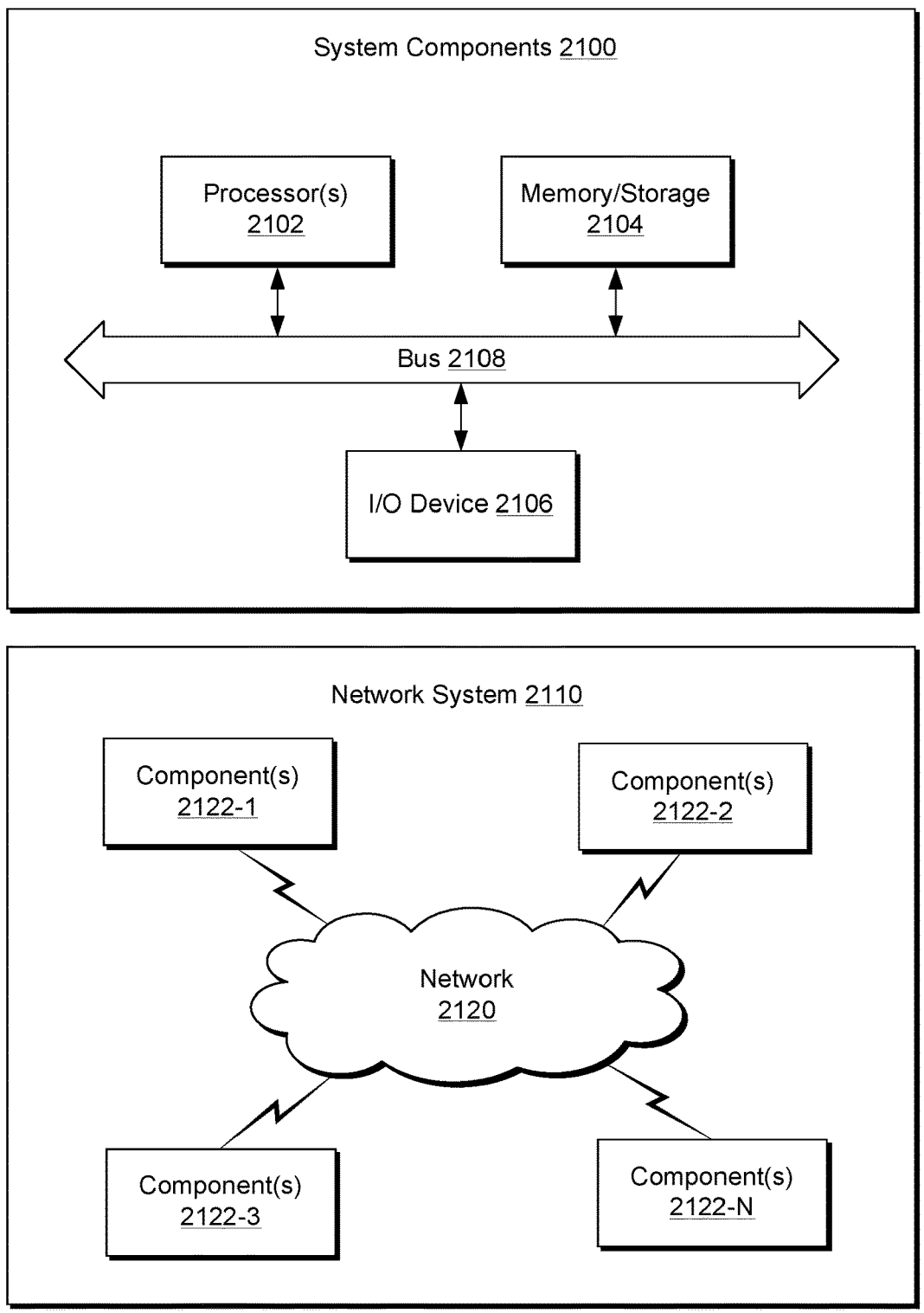
FIG. 21 illustrates example components of a system and a networked system.

FIG. 21 shows components of an example of a computing system 2100 and an example of a networked system 2110. One or more of such systems may be utilized to perform one or more actions of a method such as, for example, the method 2000 of FIG. 20. In the example of FIG. 21, the system 2100 includes one or more processors 2102, memory and/or storage components 2104, one or more input and/or output devices 2106 and a bus 2108. In an example embodiment, instructions may be stored in one or more computer-readable media (e.g., memory/storage components 2104). Such instructions may be read by one or more processors (e.g., the processor(s) 2102) via a communication bus (e.g., the bus 2108), which may be wired or wireless. The one or more processors may execute such instructions to implement (wholly or in part) one or more attributes (e.g., as part of a method). A user may view output from and interact with a process via an I/O device (e.g., the device 2106). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2110. The network system 2110 includes components 2122-1, 2122-2, 2122-3, ... 2122-N. For example, the components 2122-1 may include the processor(s) 2102 while the component(s) 2122-3 may include memory accessible by the processor(s) 2102. Further, the component(s) 2122-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving seismic data of a seismic survey of a subterranean environment wherein the seismic data are acquired via survey equipment that comprises seismic energy sources and seismic energy receivers arranged according to a seismic survey geometry;
defining a two-dimensional domain in dimensions x and y;
identifying a target trace (S, R) of the seismic survey wherein S represents a source at $(x_S, y_S)$ and wherein R represents a receiver at $(x_R, y_R)$;
defining with respect to the two-dimensional domain, a source trace $(S, X_1)$ as a primary trace, a receiver trace $(R, X_2)$ as a primary trace, and a generator trace $(X_1, X_2)$ as associated with an interbed multiple generator defined with respect to a depth dimension z;
convolving the primary traces and crosscorrelating with the generator trace for a plurality of different $(X_1, X_2)$ pairs wherein each of the plurality of $(X_1, X_2)$ pairs defines a line segment wherein the line segments are substantially parallel to one another; and
based at least in part on the convolving the primary traces and crosscorrelating with the generator trace, generating seismic data with attenuated multiple energy.

2. The method of claim 1 wherein, the line segments are substantially parallel to a line segment between $(x_S, y_S)$ and $(x_R, y_R)$.

3. The method of claim 2 wherein the line segment between $(x_S, y_S)$ and $(x_R, y_R)$ defines a reference azimuth.

4. The method of claim 1 wherein the plurality of $(X_1, X_2)$ pairs defines a first set of pairs and comprising performing the convolving for a second set of a plurality of different $(X_1, X_2)$ pairs wherein each of the plurality of $(X_1, X_2)$ pairs of the second set defines a line segment wherein the lines segments are substantially parallel to one another and at an angle with respect to the line segments of the first set.

5. The method of claim 4 wherein the angle is an azimuth defined with respect to the line segment between $(x_S, y_S)$ and $(x_R, y_R)$.

6. The method of claim 4 comprising repeating the convolving for at least a third set at another, different angle with respect to the line segments of the first set.

7. The method of claim 6 comprising, based at least in part on the convolving the primary traces and crosscorrelating with the generator trace, generating seismic data with attenuated multiple energy.

8. The method of claim 6 wherein the first set, the second set and the third set correspond to different angles in a range of angles.

9. The method of claim 1 comprising rendering an image to a display utilizing the seismic data with attenuated multiple energy.

10. The method of claim 9 comprising identifying a portion of a reservoir in the image.

11. The method of claim 1 wherein the two-dimensional domain defines a grid of points in the dimensions x and y wherein the grid of points is rotated from an inline direction of the seismic survey by an azimuth (θ).

12. The method of claim 1 wherein the interbed multiple generator defined with respect to the depth dimension z is a first interbed multiple generator.

13. The method of claim 12 comprising selecting a second, different interbed multiple generator defined with respect to the depth dimension z and repeating the method for the second, different interbed multiple generator.

14. The method of claim 13 comprising selecting a third, different interbed multiple generator defined with respect to the depth dimension z and repeating the method for the third, different interbed multiple generator.

15. A system comprising:
a processor;
memory accessible by the processor; and
processor-executable instructions stored in the memory that are executable to instruct the system to:
receive seismic data of a seismic survey of a subterranean environment wherein the seismic data are acquired via survey equipment that comprises seismic energy sources and seismic energy receivers arranged according to a seismic survey geometry;
define a two-dimensional domain in dimensions x and y;
identify a target trace (S, R) of the seismic survey wherein S represents a source at $(x_S, y_S)$ and wherein R represents a receiver at $(x_R, y_R)$;
define with respect to the two-dimensional domain, a source trace $(S, X_1)$ as a primary trace, a receiver trace $(R, X_2)$ as a primary trace, and a generator trace $(X_1, X_2)$ as associated with an interbed multiple generator defined with respect to a depth dimension z;
convolve the primary traces and crosscorrelate with the generator trace for a plurality of different $(X_1, X_2)$ pairs wherein each of the plurality of $(X_1, X_2)$ pairs defines a line segment wherein the line segments are substantially parallel to one another; and
based at least in part on the convolution of the primary traces and crosscorrelation with the generator trace, generate seismic data with attenuated multiple energy.

16. The system of claim 15 wherein, the line segments are substantially parallel to a line segment between $(x_S, y_S)$ and $(x_R, y_R)$.

17. The system of claim 16 wherein the line segment between $(x_S, y_S)$ and $(x_R, y_R)$ defines a reference azimuth.

18. The system of claim 15 wherein the plurality of $(X_1, X_2)$ pairs defines a first set of pairs and comprising instructions to convolve for a second set of a plurality of different $(X_1, X_2)$ pairs wherein each of the plurality of $(X_1, X_2)$ pairs of the second set defines a line segment wherein the lines segments are substantially parallel to one another and at an angle with respect to the line segments of the first set.

19. The system of claim 18 wherein the angle is an azimuth defined with respect to the line segment between $(x_S, y_S)$ and $(x_R, y_R)$.

20. One or more computer-readable storage media comprising computer-executable instructions to instruct a system to:
receive seismic data of a seismic survey of a subterranean environment wherein the seismic data are acquired via survey equipment that comprises seismic energy sources and seismic energy receivers arranged according to a seismic survey geometry;

define a two-dimensional domain in dimensions x and y;
identify a target trace (S, R) of the seismic survey wherein S represents a source at $(x_S, y_S)$ and wherein R represents a receiver at $(x_R, y_R)$;
define with respect to the two-dimensional domain, a source trace $(S, X_1)$ as a primary trace, a receiver trace $(R, X_2)$ as a primary trace, and a generator trace $(X_1, X_2)$ as associated with an interbed multiple generator defined with respect to a depth dimension z;
convolve the primary traces and crosscorrelate with the generator trace for a plurality of different $(X_1, X_2)$ pairs wherein each of the plurality of $(X_1, X_2)$ pairs defines a line segment wherein the line segments are substantially parallel to one another; and
based at least in part on the convolution of the primary traces and crosscorrelation with the generator trace, generate seismic data with attenuated multiple energy.

* * * * *